(12) United States Patent
Spence et al.

(10) Patent No.: US 7,967,127 B2
(45) Date of Patent: Jun. 28, 2011

(54) ADJUSTABLE STAR WHEEL CONVEYOR

(75) Inventors: Ian Spence, North Lanarkshire (GB); John Robertson, Glasgow (GB); Allan Rodger, Motherwell (GB)

(73) Assignee: Diageo PLC, Edinburgh (GB)

( * ) Notice: Subject to any disclaimer, the term of this patent is extended or adjusted under 35 U.S.C. 154(b) by 1049 days.

(21) Appl. No.: 10/573,235

(22) PCT Filed: Sep. 27, 2004

(86) PCT No.: PCT/GB2004/004142
§ 371 (c)(1),
(2), (4) Date: May 14, 2007

(87) PCT Pub. No.: WO2005/030616
PCT Pub. Date: Apr. 7, 2005

(65) Prior Publication Data
US 2007/0271871 A1 Nov. 29, 2007

(30) Foreign Application Priority Data

Sep. 25, 2003 (GB) .................................... 0322492.0
Jun. 21, 2004 (GB) .................................... 0413853.3

(51) Int. Cl.
*B65G 47/86* (2006.01)
(52) U.S. Cl. ................... 198/459.2; 198/473.1; 198/723; 198/803.11
(58) Field of Classification Search ............... 198/459.2, 198/377.03, 377.07, 470.1, 473.1, 723, 803.11
See application file for complete search history.

(56) References Cited

U.S. PATENT DOCUMENTS

| | | | | |
|---|---|---|---|---|
| 1,309,935 A * | 7/1919 | Calleson | ........................ | 198/494 |
| 1,941,152 A * | 12/1933 | Noll | ............................ | 198/459.2 |
| 2,787,359 A * | 4/1957 | Gerecke | ......................... | 198/441 |
| 3,237,276 A * | 3/1966 | Von Der Ohe | ................ | 241/294 |
| 3,957,154 A * | 5/1976 | Shiba | ............................. | 198/394 |
| 4,428,474 A | 1/1984 | Gau et al. | | |
| 4,512,456 A | 4/1985 | Peyton | | |
| 5,291,988 A | 3/1994 | Leonard | | |
| 5,590,753 A | 1/1997 | Bertschi et al. | | |
| 6,557,695 B2 * | 5/2003 | Gerber et al. | .............. | 198/473.1 |
| 2009/0057099 A1 * | 3/2009 | Preti et al. | .................. | 198/459.2 |

FOREIGN PATENT DOCUMENTS

| | | |
|---|---|---|
| CH | 431 377 | 8/1967 |
| DE | 19903319 | 8/1999 |
| EP | 0 412 059 A1 | 8/1989 |
| EP | 0 355 971 | 2/1990 |
| EP | 0 366 225 | 5/1990 |
| EP | 0 659 683 A1 | 6/1995 |
| WO | WO 2005/030616 A3 | 4/2005 |
| WO | WO 2005/123553 A1 | 12/2005 |

* cited by examiner

*Primary Examiner* — Mark A Deuble
(74) *Attorney, Agent, or Firm* — Brinks Hofer Gilson & Lione

(57) ABSTRACT

The present invention relates to an adjustable star wheel and guide rail assembly for use with containers being processed on an automated handling line between machines such as rotary packaging machines. Star wheels derive their name from their general shape. The star wheels of this invention have fingers that support containers, such that they convey the containers as the star wheel rotates. Conveniently, the fingers of the present invention may be set in any position within their range of movement. In addition, a supporting guide rail may be adjusted, for example by rotation on cams. Thus, the fingers and the guide rail may be set to convey containers of varying sizes while keeping the container's centers travelling along the centerline of the conveyor.

22 Claims, 16 Drawing Sheets

ADJUSTABLE STAR WHEEL CONVEYOR

This application claims the benefit of priority under 35 U.S.C. §371 to Patent Cooperation Treaty Patent Application No. PCT/GB2004/004142, filed on Sep. 27, 2004, which was published in English under Publication No. WO 2005/030616. This application further claims the benefit of priority to UK applications GB 0322492.0 filed on Sep. 25, 2003 and GB 0413853.3 filed on Jun. 21, 2004. The disclosures of the above applications are incorporated herein by reference.

The present invention relates to an adjustable star wheel and guide rail assembly for use with containers being processed on an automated handling line.

Star wheels are used on various types of automated handling lines to convey containers to and from, and within, various machines, such as rotary packaging machines. In particular, star wheels are used to convey containers between rectilinear conveyors to a rotating machine part and back to a rectilinear conveyor. Such star wheels may be used with a number of containers that include bottles, cans and tins, although it will be realised that this list is not exhaustive. The various rotary packaging machines may perform various functions, e.g. cleaning, filling, capping or labelling a container.

Star wheels derive their name from the shape of one of their type: members of this type are generally disk shaped and their periphery contains a plurality of recesses or pockets thereby forming a star-shape. Other star wheels have circular peripheries with projecting fingers to engage the containers, and here it is the fingers that lend a general star-shape to the star wheel. Star wheels rotate about a central axis and generally comprise a pair of disk-like plates centred on this axis. Recesses may be provided in the peripheries of the disks to form pockets for receiving containers therein. The star wheel is positioned on an automated handling line so that a container travelling down the handling line is received within a pocket as the star wheel rotates. The container is retained within the pocket as the star wheel rotates before being released at a defined point.

Containers are generally retained within a pocket by supporting the container between a pair of contact surfaces that urge the container against a guide rail that encircles at least part of the star wheel's periphery. A second type of star wheel provides an alternative form of support by providing pairs of jaws to grip the container about its sides. This design also does not need disks to define peripheral recesses.

A star wheel may convey a container to a closely-defined point within a rotary packaging machine or along a closely-defined path through a rotary packaging machine. For example, the container may be a bottle with a narrow neck that is presented to a filling machine: when presented, the neck of the bottle must be on the correct path such that it passes exactly beneath a filling nozzle. Thus, it is important that the centre of the container follows a predetermined path.

In general, any automated handling line may be used to process containers of varying shapes and sizes. In the past, each star wheel could only handle containers of a specific shape and size, so this meant having to change the star wheel each time a different container was introduced onto a handling line. This is undesirable as it is both time consuming and necessitates having to keep a stock of different-sized star wheels. Attempts have been made to overcome this problem.

International Patent Application No. PCT/IT99/00072 and U.S. Pat. No. 5,743,377 both describe star wheels that use pliers-like jaws for holding round bottles. The jaws have a curvature corresponding to the bottles to be gripped. This design requires the jaws to open in order for a bottle to be received therein before they can close around the bottle. Accordingly, their designs are complicated in that the jaws must be able to open and close around varying ranges of travel to accommodate bottles of any difference in diameter. The jaws are opened and closed via rotation of a cam and the range of rotation of the cam is varied to adjust the range of travel of the jaws. However, only a small range of bottle sizes can be accommodated due to the fact that the grips must open and close and because the curvature of the grips must correspond to the bottle if a sufficient area of contact is to be made with the bottle to establish a firm grip. The devices of PCT/IT99/00072 and U.S. Pat. No. 5,743,377 also have a further problem in that they are not suited for handling containers that are not round in cross-section.

EP-A-0,412,059 describes an adjustable conveyor comprising a star wheel with a plurality of recesses that make use of radially adjustable push rods to distance a container from the centre of the wheel according to its diameter, in conjunction with an adjustable guide that provides an external restraint. EP-A-0,412,059 may be used with containers of varying sizes but the shape of the push rod means that only a limited range of sizes can be accommodated. For example, where bottles of greatly differing sizes are to be processed, a number of push rods would need to be provided. This necessitates keeping a stock of guide arms and also requires more timely conversion of the star wheel for bottles of greatly differing size.

Against this background, and from a first aspect, the present invention resides in an adjustable star wheel rotatable about a central axis, comprising a pocket for receiving a container therein, and a pair of opposed, spaced apart fingers defining at least in part the pocket, each finger providing a contact surface for contacting a container when received in the pocket, wherein at least one of the fingers is rotatably mounted on a shaft extending substantially parallel to the central axis so as to be rotatable within a range of movement thereby adjusting the width of the pocket, the star wheel further comprising setting means operative to set the rotatable finger in substantially any position within the range of movement.

Clearly, being able to set the finger at any position within its range of movement affords greater flexibility of operation in that the pocket can be set to any width and so accommodates containers of many different sizes.

The contact surfaces may allow a container to make contact with the fingers in any number of positions, i.e. a small container will make contact at a pair of points closer together than a larger container. Providing fingers that can rotate apart to give a variable range of separations allows a greater range of sizes of containers to be accommodated. In addition, containers of differing shapes can also be accommodated.

Preferably, both fingers of the pair are rotatably mounted on respective shafts extending substantially parallel to the central axis so as to be rotatable in opposite senses within respective ranges of movement, and the setting means is operative to set the fingers in any position within their respective ranges of movement. This allows a greater range of separations to be achieved and preserves the symmetry of the pocket.

Advantageously, the recess is symmetrical about a centre line corresponding to the radius of the star wheel and the pair of fingers comprise curved contact surfaces whose curvature extends away from the centre line as the fingers extend away from the central axis. This means that larger bottles are accommodated deeper in the recess and this can be exploited such that the centre point of a container remains a fixed distance from the central axis irrespective of the size of the container. In addition, the contact points with containers move apart and back into the recess as separation of the fingers increases. Optionally, the radius of curvature of the contact surfaces decreases as the fingers extend away from the central axis.

Optionally, the star wheel further comprises a moveable back plate operative to be moved substantially radially into and out from the pocket. This provides further support for a container. The back plate may present a concave surface so as to provide two further contact points. This helps prevent rotation of a container when accommodated in the pocket.

From a second aspect, the present invention resides in an adjustable star wheel rotatable about a central axis comprising a plurality of pockets distributed around the star wheel, each pocket being defined at least in part by a pair of opposed, spaced apart fingers, each finger providing a contact surface for contacting a container when received in its associated pocket and being rotatably mounted on respective shafts extending substantially parallel to the central axis so as to be rotatable within a range of movement, the fingers of each pair being rotatable in opposite senses thereby adjusting the width of the pocket they define, the star wheel further comprising setting means operative to set the fingers in substantially any position within their range of movement.

The setting means may comprise a mechanism to set the positions of all fingers together or may comprise separate mechanisms to allow the positions of fingers to be set independently.

Preferably, neighbour fingers from adjacent pockets are mounted on their shafts in a crossed configuration. By crossed configuration, it is meant that, looking radially towards the central axis, the shaft for the left finger of a pair is positioned to the left of the right finger of the next pair to the left. Hence, the fingers then cross one another is a generally X-shaped configuration. This provides a compact arrangement that allows a smaller size of star wheel to be achieved.

The star wheel preferably comprises a toothed common drive means and the fingers are provided with teeth, the common drive means and fingers being arranged with meshed teeth such that the fingers are rotatably driven by the common drive means. This provides a simple arrangement for rotating the fingers in unison. Optionally, the teeth of one finger from each pair defining a pocket meshes with the teeth of the drive means in a rack and pinion arrangement. Preferably, the teeth of the finger meshed with the common drive means also mesh with the teeth of its neighbour finger from the adjacent pocket, every other finger around the star wheel meshing with the common drive means, such that the common drive means drives each set of neighbour finger in an opposite sense. Meshing fingers of adjacent recesses allows one finger to be driven directly by the rack and the other finger to be driven indirectly through the other finger. Advantageously, this results in adjacent fingers rotating in opposite senses, as is required for each pair of fingers to open or close in unison. Using teeth on both fingers of the same pitch ensures that the fingers rotate through the same angle. The teeth may be provided as separate elements attached to the fingers or they may be integral with the fingers. For example, a corner of the fingers may be provided with teeth or the teeth may be part of a complete cogwheel joined to the finger.

Optionally, the common drive means is an annular member with a toothed periphery. This allows all pockets defined by the fingers to open or close in unison when driven by a single mechanism. This mechanism may be, for example, rotatable by manual adjustment such as by a thumbwheel connected to a further pinion. Optionally, the thumb wheel is attached to the shaft by an arm such that the thumb wheel is rotatable about the shaft on an arcuate path. This path may extend over a scale from which the position of the fingers may be determined. Conveniently, the thumb wheel attaches to the arm via a releasable clamp that clamps the thumb wheel in position, thereby providing the setting means. For example, the clamp may comprise the thumb wheel and a base plate connected via a threaded post that projects through a top plate of the star wheel such that the thumb wheel may be screwed to clamp the top plate between the thumb wheel and base plate.

Advantageously, the annular member has an associated travel-limiting means. This ensures that the fingers cannot be driven too far apart or too close together. For example, it may ensure that the fingers cannot be driven into an adjacent structure of the star wheel. Conveniently, the travel-limiting means comprises a circumferentially-extending slot provided in the drive means that receives a static member therein.

Optionally, each pocket is partially defined by a second pair of fingers like the first pair, the first and second pair of fingers being spaced apart in the axial direction. This may allow a container to be supported at two levels thereby increasing stability. Advantageously, the axially-spaced pairs of fingers are adjustable independently. This allows containers whose cross-section varies with height to be accommodated.

From a third aspect, the present invention resides in an adjustable star wheel rotatable about a central axis comprising a disk with a periphery, the periphery being shaped to define at least in part a pocket for receiving a container therein, the star wheel further comprising a pair of opposed, spaced apart fingers positioned within the pocket, each finger providing a contact surface for contacting a container when received in the recess, wherein at least one finger is rotatable with respect to the disk about an axis substantially parallel to the central axis thereby allowing the separation of the fingers to be varied.

The contact surfaces may allow a container to make contact with the fingers in any number of positions, i.e. a small container will make contact at a pair of points closer together than a larger container. Providing fingers that can rotate apart to give a variable range of separations allows a greater range of sizes of containers to be accommodated. In addition, containers of differing shapes can also be accommodated.

Preferably, both fingers of the pair are rotatable in opposite senses about an axis or axes substantially parallel to the central axis. This allows a greater range of separations to be achieved.

Preferably, both fingers of a pair are rotatable about axes that are circumferentially offset across the recess and, optionally, at least one finger is rotatable about an axis that passes through the at least one finger. Preferably, the at least one finger is generally elongate radially with respect to star wheel and is rotatable about an axis passing through the at least one finger at or towards an end closest to the central axis.

Advantageously, the recess is symmetrical about a centre line corresponding to the radius of the star wheel and the pair of fingers comprise curved contact surfaces whose curvature extends away from the centre line as the fingers extend away from the central axis. This means that larger bottles are accommodated deeper in the recess and this can be exploited such that the centre point of a container remains a fixed distance from the central axis irrespective of the size of the container. In addition, the above combination of features provides contact points with containers that move apart and back into the recess as separation of the fingers increases. Optionally, the radius of curvature of the contact surfaces decreases as the fingers extend away from the central axis.

Optionally, the star wheel comprises a pair of rotatable fingers each provided with a plurality of teeth and wherein the pair of rotatable fingers are rotatable by a common drive means that engages with the teeth of one finger. This provides a simple arrangement for rotating the fingers in unison. Using teeth on both fingers of the same pitch ensures that the fingers rotate through the same angle. The teeth may be provided as separate elements attached to the fingers or they may be integral with the fingers. For example, a corner of the fingers may be provided with teeth or the teeth may be part of a complete cogwheel. Optionally, the teeth of one finger meshes with teeth of the larger drive means in a rack and pinion arrangement.

Preferably, the star wheel further comprises a second recess like the first recess with a finger of the first recess being driveable directly by the drive means and wherein the second recess is located adjacent to the first recess with the teeth a finger of the first recess meshing with the teeth of a finger of the second recess thereby making the finger of the second recess driveable indirectly by the drive means. By 'like', it is meant that the second recess also has a pair of rotatable fingers as described for the first recess. Meshing fingers of adjacent recesses allows one finger to be driven directly by the rack and the other finger to be driven indirectly through the other finger. Advantageously, this results in adjacent fingers rotating in opposite senses, as is required for each pair of fingers to open or close in unison.

Conveniently, the star wheel further comprises a plurality of corresponding recesses forming a never-ending series around the periphery of the disk thereby enabling each finger of each recess to be paired with a finger from the adjacent recess and wherein one finger from each pair comprises teeth meshed with a larger, common drive means in a rack and pinion arrangement, the drive means being rotatable about the central axis and the other finger from each pair comprising teeth meshed with the teeth of its paired finger. This allows all pockets defined by the fingers to open or close in unison when driven by a single mechanism. This mechanism may be, for example, rotatable by manual adjustment such as by a thumbwheel connected to a further pinion. Optionally, the rack is an annular member.

Advantageously, the rack has an associated travel-limiting means. This ensures that the fingers cannot be driven too far apart or too close together. For example, it may ensure that the fingers cannot be driven into an adjacent structure of the star wheel. Conveniently, the travel-limiting means comprises a circumferentially-extending slot provided in the drive means that receives a member therein.

Optionally, at least one recess is provided with a further pair of fingers positioned within the recess, the further pair being like the first pair and spaced therefrom in the axial direction. This may allow a container to be supported at two levels thereby increasing stability. Advantageously, the axially-spaced pairs of fingers are adjustable independently. This allows containers whose cross-section varies with height to be accommodated.

Conveniently, a finger from the first pair and a finger from the further pair are mounted on a common shaft and, optionally, the shaft may serve as a spacer for a pair of spaced-apart opposed disks having edges that follow a regular meandering path thereby forming the plurality of recesses.

From a fourth aspect, the present invention resides in an automated handling line guide rail assembly comprising a guide rail defining a limit of a path of a container when conveyed, wherein the guide rail is connected to one cam such that the guide rail is moveable by rotation of the at least one cam at least thereby adjusting the outer limit of the path. This allows containers of varying sizes to be accommodated, for example when used with an adjustable star wheel of the type previously described. Advantageously, it allows the centre point of the container to remain at a fixed distance from the central axis of the star wheel no matter the size of the container.

Optionally, the guide rail is connected to a plurality of cams. The shape of the cams can be tailored to produce the desired range of paths. Conveniently, the assembly further comprises a chain or a belt arranged to rotate the cams. Optionally, the assembly further comprises a pin that passes through a slot provided in the guide rail thereby limiting movement of the guide rail.

Preferably, the assembly further comprises a second moveable guide rail whose shape corresponds to that of the first guide rail and arranged to contact at a second point a container when conveyed, wherein the second guide rail is moveable independently of the first guide rail. When used in combination with a star wheel having two pairs of fingers per recess, the guide rails may be positioned at the same level as the pairs of fingers.

In a currently preferred embodiment, a pair of guide rail assemblies may be arranged in a back to back alignment.

From a fifth aspect, the present invention resides in a star wheel conveyor comprising an adjustable star wheel as described above and a guide rail assembly as described above.

From a fifth aspect, the present invention resides in a star wheel conveyor comprising an adjustable star wheel and a guide rail assembly comprising a guide rail that defines the perimeter of a path of a container when conveyed along part of an automated handling line, the path and hence the perimeter being arcuate about a centre and positioned at a radius from the centre, wherein the guide rail is movable radially to define the perimeter at a plurality of different radii from substantially the same centre.

From a sixth aspect, the present invention resides in an automated handling line comprising a rectilinear input conveyor, a star wheel conveyor as described above and a rotary handling machine wherein the star wheel conveyor is arranged, in use, to receive containers travelling along the input conveyor in a recess, to convey the container in a circular path and to release the container on a path tangential to a rotating part of the rotary handling machine.

Other preferred, but optional, features of the present invention are set out in the appended claims.

In order that the invention can be more readily understood, reference will now be made by way of example only, to the accompanying drawings in which:

FIG. 1-6 is a stepped section taken through line XVI-XVI of FIG. 13;

Figure 1:
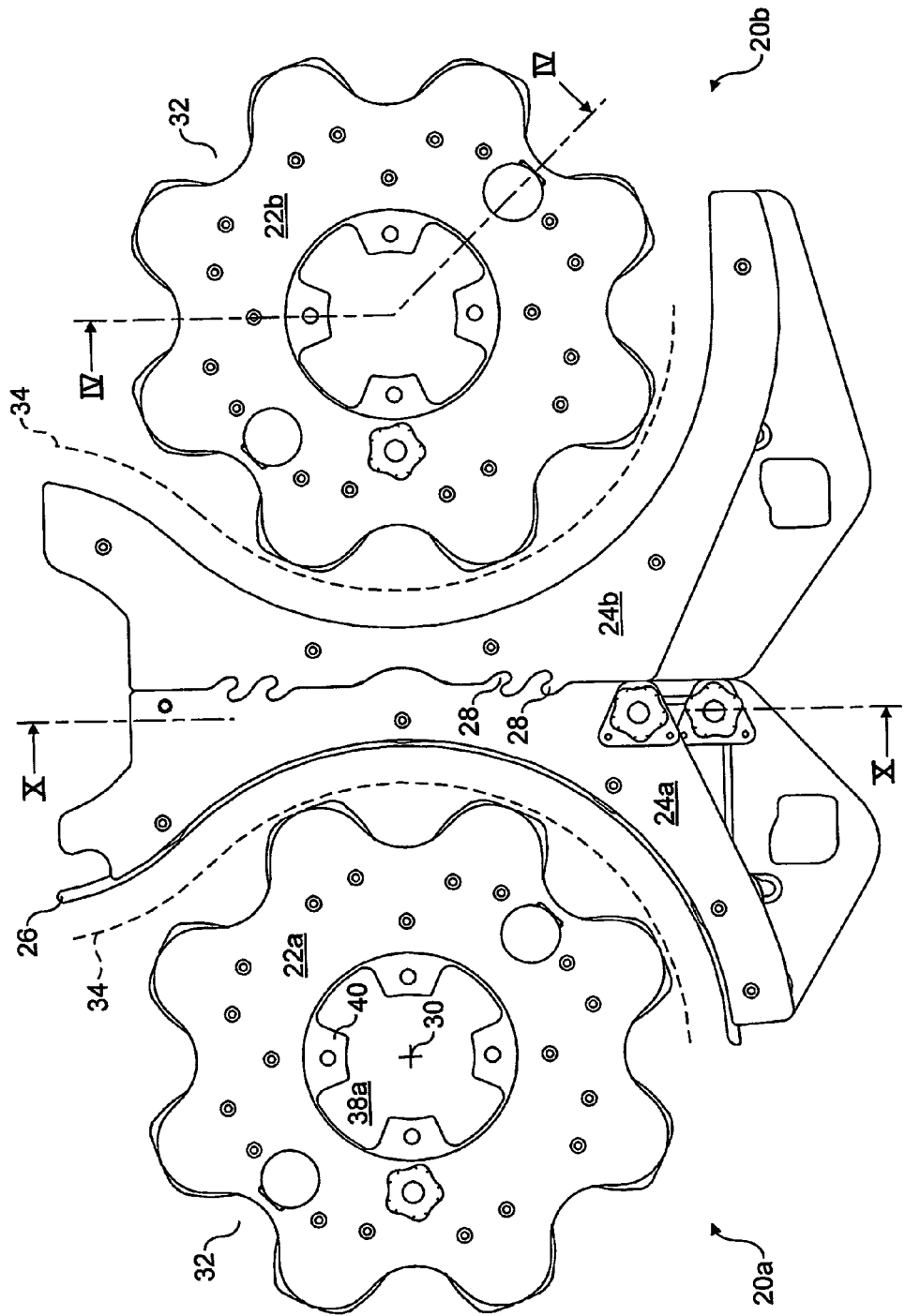
FIG. 1 is a plan view of a pair of star wheel conveyors according to a first embodiment of the present invention, each pair comprising a star wheel and a guide rail assembly.
Figure 2:
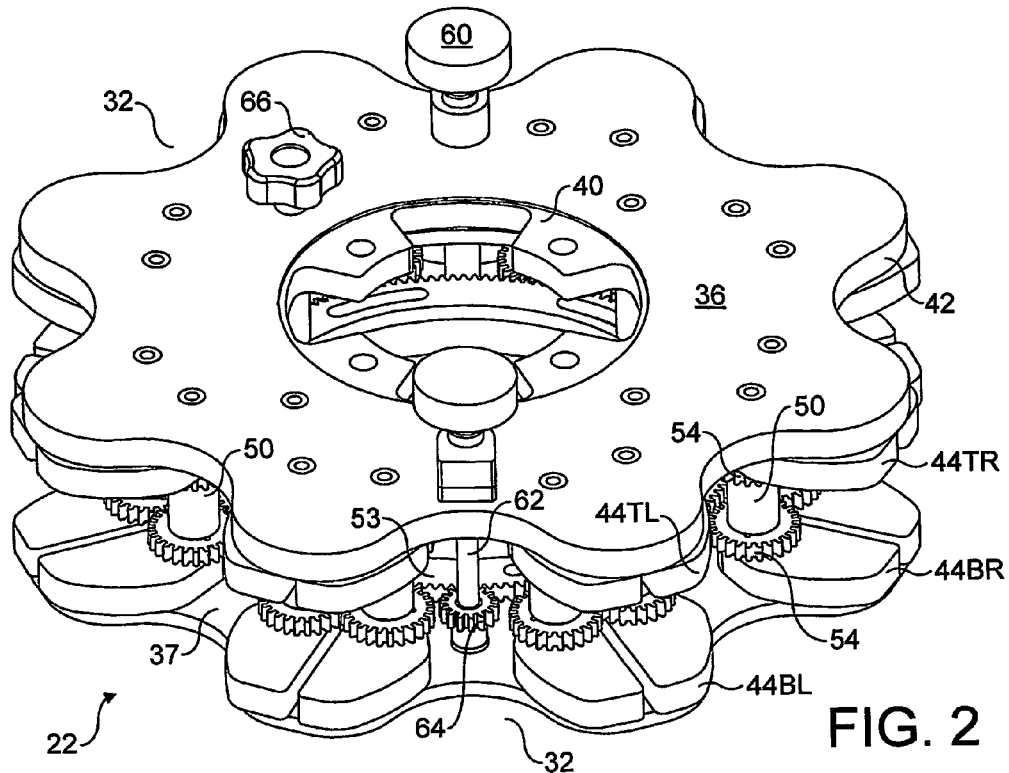
FIG. 2 is a perspective view of the star wheel of FIG. 1.

A pair of star wheel conveyors 20 according to an embodiment of the present invention is shown in FIG. 1: together they convey bottles from left to right. Each pair of star wheel conveyors 20 comprises a star wheel 22 and a guide rail assembly 24. The first pair 20a, shown on the left hand side of FIG. 1, define an input path to a rotary packaging machine such as a filling machine (not shown) that comprises a large rotating conveyor whereas the second pair 20b define an output path from the filling machine. The star wheels 22 are identical, but the guide rail assemblies 24 differ because the guide rail assembly 24b on the output leg defines a longer path than on the input leg and is not provided with adjustable guide rails 26,27. Co-operating formations 28 provided on the guide rail assemblies 24 allow them to be fastened together in a back-to-back arrangement thereby defining the input and output paths relative to each other. Specifically, the input path starts and the output path ends on a common line corresponding to a pair of rectilinear conveyors (not shown) and each path conveys the bottles through an arc of about 135 degrees. The input path will end on a tangent to the rotating conveyor of the rotary packaging machine thereby feeding bottles to the filling machine in a smooth and controlled manner, with the bottles being presented to the filling machine with the required separation between consecutive bottles. Likewise, bottles are taken from the rotary packaging machine tangentially along the output path.

The input star wheel conveyor 20a will now be described in further detail. It will be appreciated that the following description will apply equally well to the output star wheel conveyor 20b and so a description of the output star wheel conveyor 20b will not be given in order to avoid repetition.

The input star wheel 22 has a central axis 30 about which it rotates such that a bottle entering the input star wheel conveyor 20 is received within a pocket 32 formed in the periphery of the input star wheel 22. When the bottle is received within a pocket 32, it is held against a pair of guide rails 26,27 of the guide rail assembly 24. The bottle is also supported from its base by a smooth floor provided beneath the input path (not shown). The centre of the neck of a bottle will follow the path indicated at 34 of FIG. 1 no matter what the size and shape of the bottle if the star wheel 22 and guide rail assembly 24 are set correctly (and assuming the neck to be positioned centrally on the bottle).

Figure 7:
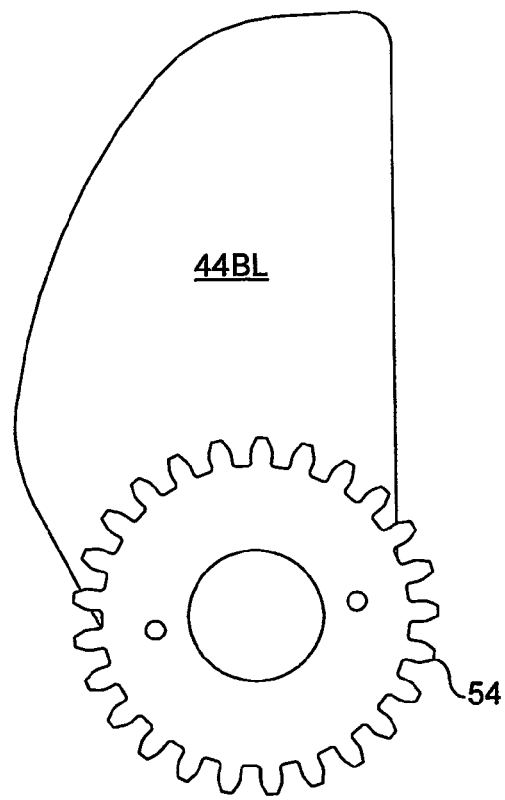
FIG. 7 is a plan view of the finger of FIG. 6.

FIGS. 2 to 5 show the star wheel 22 in more detail. The star wheel 22 comprises a pair of spaced-apart opposed disks 36,37. The disks 36,37 have central apertures 38 that allow the star wheel 22 to be mounted on a spindle (not shown). The upper disk's aperture 38 include four inwardly projecting teeth 40 that engage with corresponding formations provided on the spindle such that the star wheel 22 is driven by rotation of the spindle. The peripheral edge 42 of each disk 36,37 corresponds and is broadly circular but follows a regular meandering path thereby defining the upper and lower extent of eight pockets 32. Each pocket 32 is provided with four fingers 44: the fingers 44 are arranged top 44T and bottom 44B; and left 44L and right 44R. T, B, L and R will be appended to reference number 44 to identify the different fingers 44. Hence, 44L refers to the left fingers while 44TR refers to the top right finger. The top fingers 44T are located just below the upper disk 36 and the bottom fingers 44B are arranged just above the lower disk 37. The fingers 44 have smoothly curving inner profiles 48 that project into the pocket 32 defined by the meandering peripheral edge 42 of the disks 36,37. The inner profile 48 is best seen in FIG. 7 and forms contact surfaces for contacting a bottle when received within a pocket 32. The curve of the inner profile 48 follows the same broad direction as that of the disks 36,37 thereby creating enlarged entrances to the gap defined between the fingers 44. The curve of the inner profile 48 has a decreasing radius of curvature towards the front edge of the finger 44 (when looking into the pocket 32).

Each pair of left fingers 44L and each pair of right fingers 44R are rotatably mounted on a common shaft 50 such that the top 44T and bottom 44B fingers may be rotated independently of one another. The shafts 50 extend the full height between upper 36 and lower 37 disks and provide a second function in that they act as spacers for the disks 36,37. The shafts 50 are located at the back inside corner of each finger 44 such that the fingers 44 may be rotated to widen or narrow the width of the gap that they define. As the top 44T and bottom 44B fingers may be adjusted independently, the width of the gaps they define may be different. In this way, bottles of greatly varying sizes can be accommodated.

Figure 3:
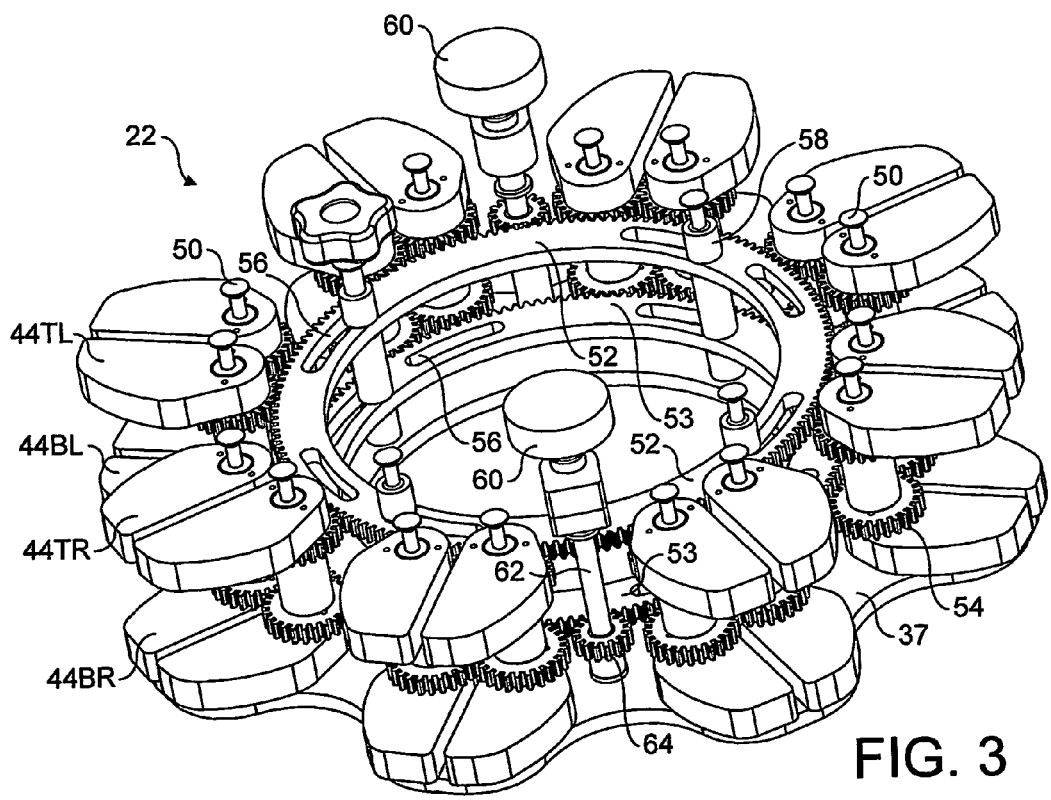
FIG. 3 is a perspective view of the star wheel of FIG. 2 with the upper plate removed.
Figure 4:
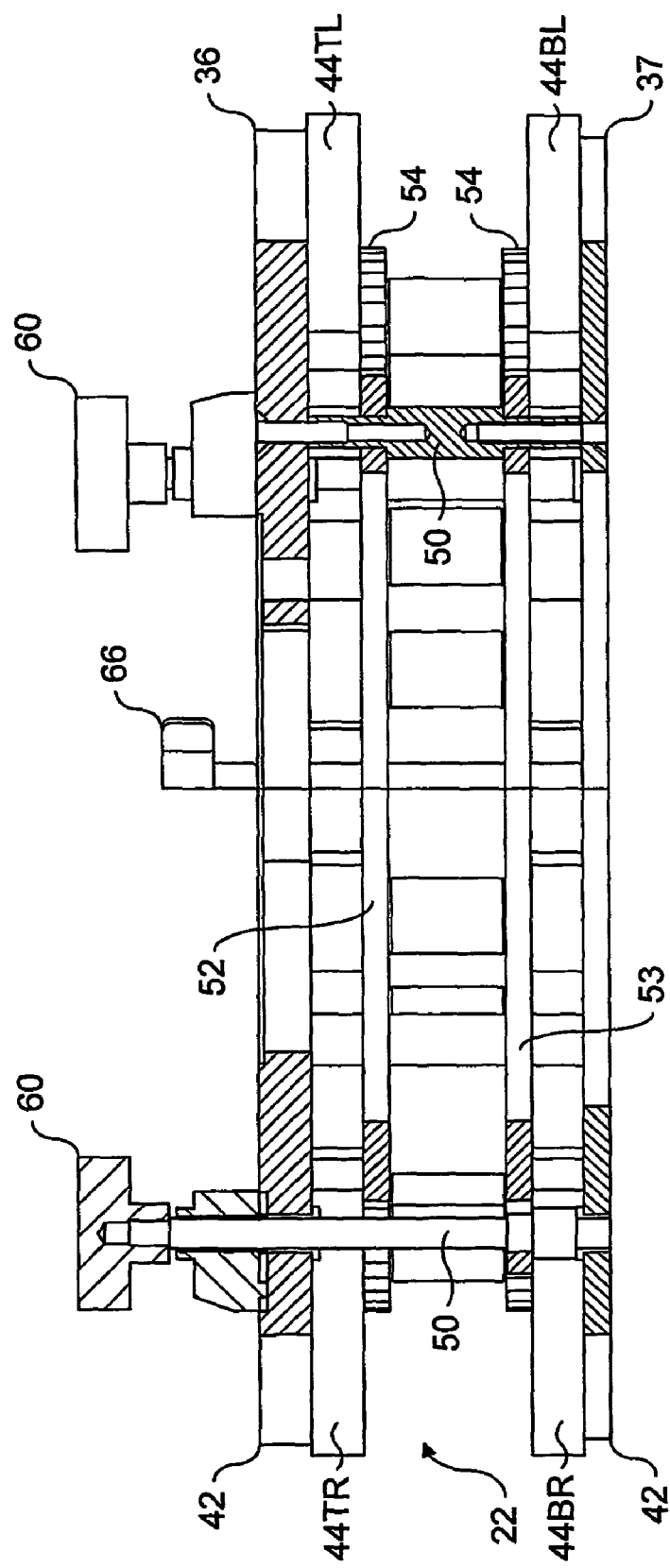
FIG. 4 is a sectional view taken along line IV-IV of FIG. 1.
Figure 5:
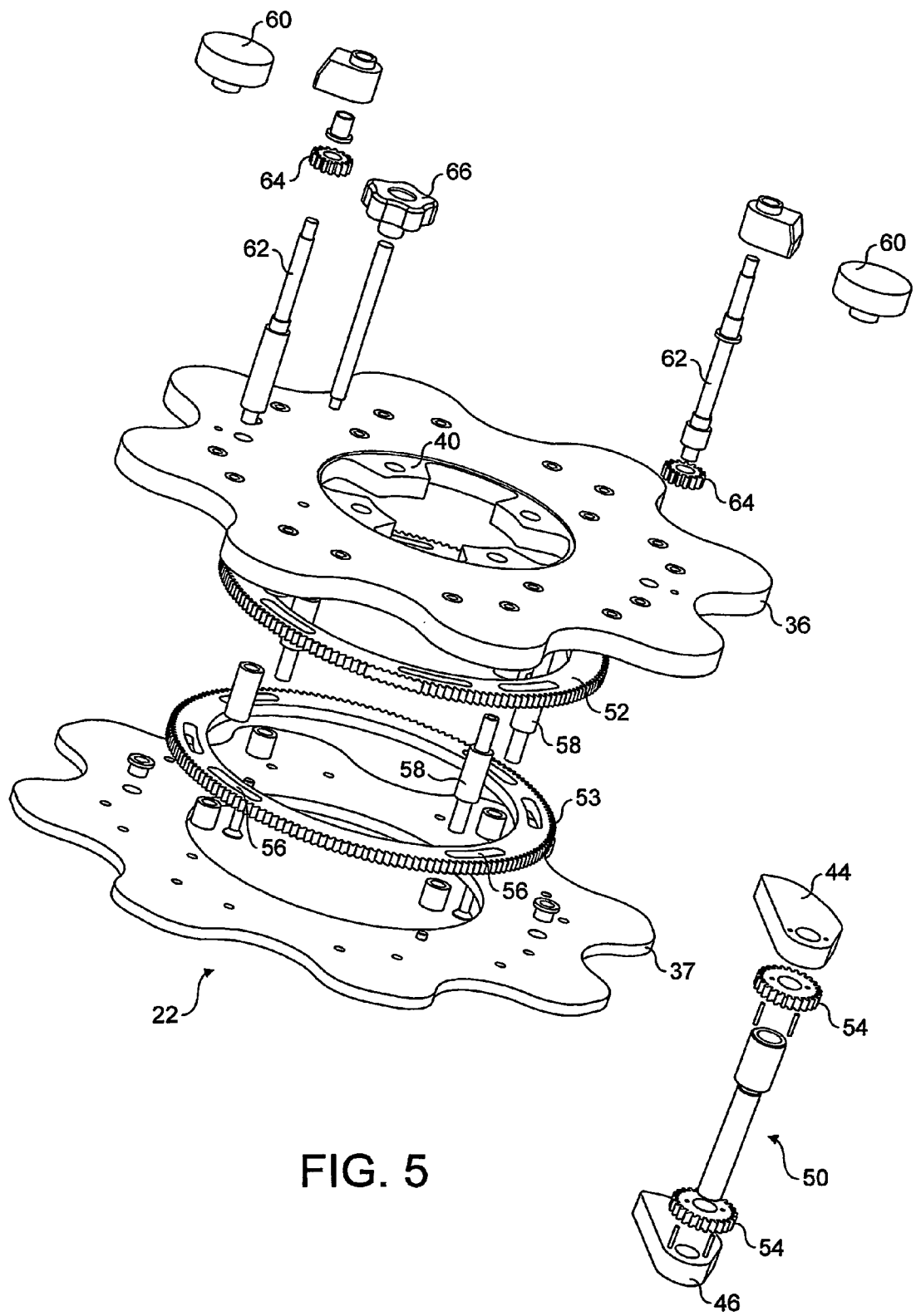
FIG. 5 is an exploded view of the star wheel of FIG. 2.
Figure 6:
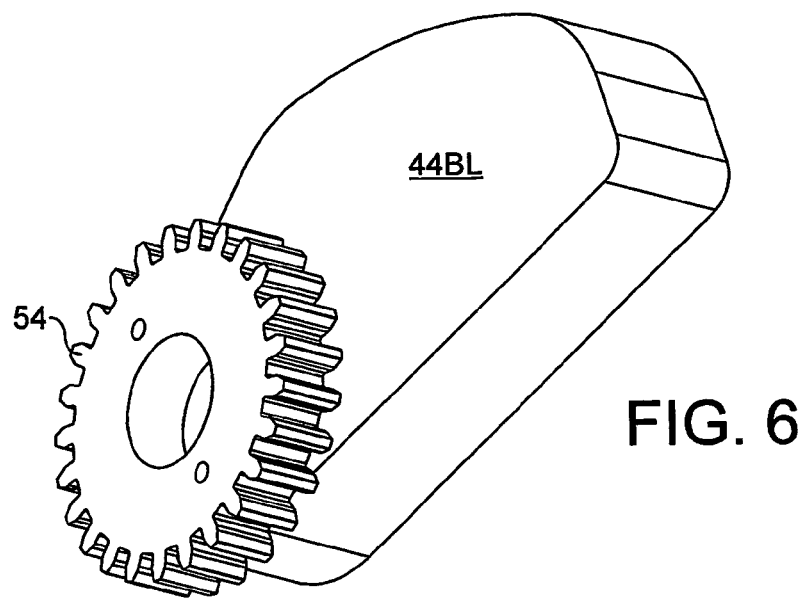
FIG. 6 is a perspective view of a finger of the star wheel of FIG. 2.

Rotation of the fingers 44 is driven by a pair of annular cog wheels 52,53 that are centred on the central axis 30 of the star wheel 22: all top fingers 44T are driven by an upper cog wheel 52 and all bottom fingers 44B are driven by a lower cog wheel 53. This is achieved by mounting the cog wheels 52,53 on the same level as pinions 54 provided on the corresponding top 44T or bottom 44B fingers, as shown in FIGS. 6 and 7. FIG. 3 shows that the cog wheels 52,53 are dimensioned so that teeth provided on their peripheral edge engage with the pinions 54 of alternate fingers 44R (referred to hereinafter as 'driver' fingers). The cog wheels 52,53 each have four slots 56 and are arranged such that the four slots 56 are aligned. A rod 58 projects through each pair of aligned slots 56 such that the cog wheels 52,53 can rotate about the central axis 30 through a limited angle. This limit of travel of the cog wheels 52, 55 imposes a limit of travel on the fingers 44 thereby ensuring that they do not inadvertently contact adjacent components. The rod 58 also acts as a spacer for the disks 36,37.

Each cog wheel 52,53 is driven by a thumbwheel 60 provided on a spindle 62 that projects through the upper disk 36, although other drive means may be employed. The other end of the spindle 62 is provided with a pinion 64 that engages with the teeth provided on the peripheral edge of its associated cog wheel 52,53. Hence, turning the appropriate thumbwheel 60 drives either the upper 52 or lower 53 cog wheel that, in turn, drives the top 44TR or bottom 44BR driver fingers. Each pinion 54 has identical gearing such that all driver fingers 44R rotate together through the same angle.

Accordingly, a top finger 44TR and a bottom finger 44BR from each pocket 32 are connected directly to the upper 52 and lower 53 cog wheels respectively. The remaining fingers 44L are driven by the cog wheels 52,53 indirectly. All fingers 44 can be paired to their nearest neighbour: as can best be seen from FIG. 3, this neighbour will be from an adjacent pocket 32. The pinions 54 from each such pair mesh so that when a cog wheel 52,53 is rotated, the ensuing rotation of a driver finger 44R in turn drives rotation of its neighbour 'driven' finger 44L. As the pinions 54 are the same size, each finger 44 within such a pair rotates through the same angle but in an opposite sense as is required (and this is why not all fingers 44 are connected directly to the cog wheels 52,53, i.e. this would cause all fingers 44 to rotate in the same direction).

The positions of the fingers 44 are adjusted whenever a change of bottle size occurs. Once set to the correct position, they may be locked using a thumbscrew 66 of a locking mechanism.

The thumbscrew 66 includes a lower surface that abuts against the upper surface of the upper disk 36. The thumbscrew 66 has a central shaft that penetrates through the upper disk 36, upper and lower cog wheels 52,53 and into a threaded hole provided in the lower disk 37. Cylindrical spacers are provided that fit around the shaft and separate lower disk 37, lower cog wheel 53, upper cog wheel 52 and upper disk 36. The lower part of the shaft is provided with a co-operating thread such that tightening the thumbscrew 66 causes the shaft to sink down into the threaded hole provided in the lower disk 37. This urges the disks 36,37 together thereby clamping the cog wheels 52,53 firmly in place between the spacers.

Turning now to the guide rail assembly 24, this is shown in detail in FIGS. 8 to 12. As noted previously, a pair of guide rail assemblies 24 are used that connect in back-to-back fashion via co-operating formations 28. Both guide rail assemblies 24 are similar, save for that the output guide rail assembly 24b defines a slightly longer path than the input guide rail assembly 24a and that the output guide rail assembly 24b does not have adjustable guide rails 26,27. Hence, only the input guide rail assembly 24a will be described to avoid repetition.

The input guide rail assembly 24a comprises a pair of spaced-apart opposed plates 80,81. Aligned edges 82 of the plates 80,81 that face the star wheel 22 are shaped to form an arcuate path with smoothly curving lead-in and lead-out portions 84,85 and whose shape and size corresponds to the star wheel 22 as can be seen from FIG. 1. A pair of guide rails 26,27 extend along the gap between the rounded edges 82 of the plates 80,81 such that the guide rails 26,27 project slightly in front of the plates 80,81 at the same height as the fingers 44 of the star wheel 22. Accordingly, a bottle passing along the input path will contact the guide rails 26,27 rather than the plates 80,81.

Figure 8:
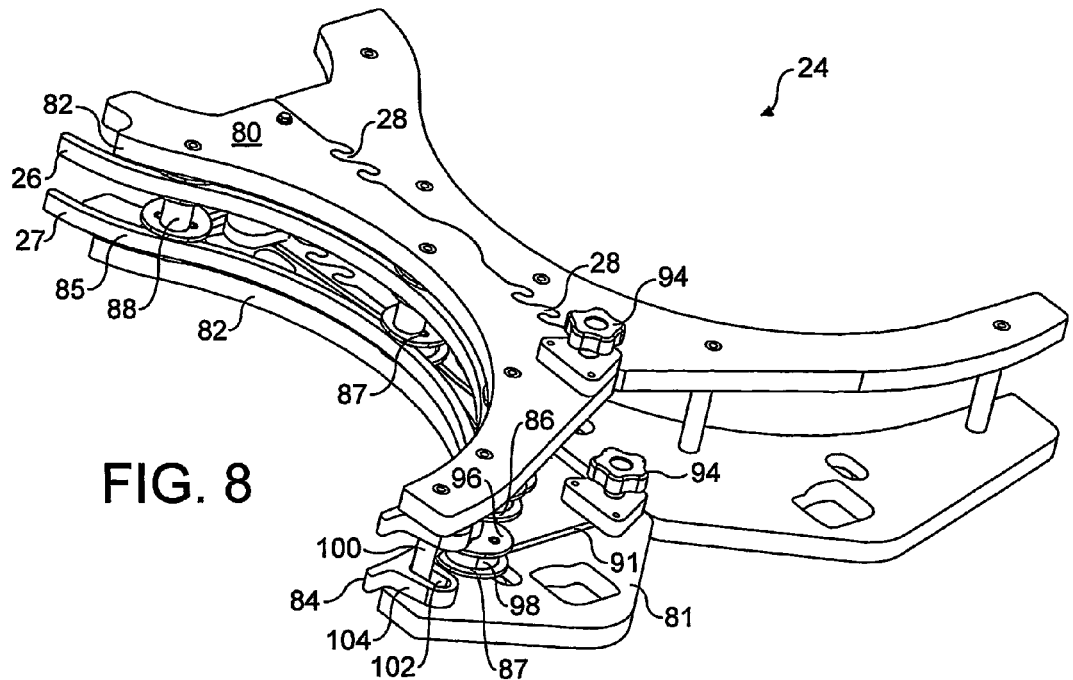
FIG. 8 is a perspective view of the guide rail assembly of FIG. 1.
Figure 9:
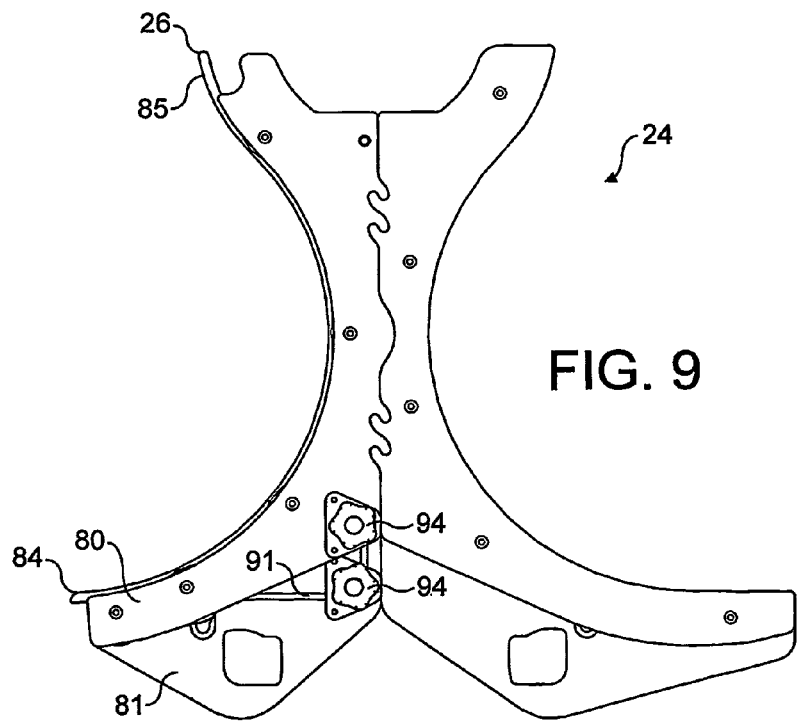
FIG. 9 is a plan view of the guide rail assembly of FIG. 8.
Figure 10:
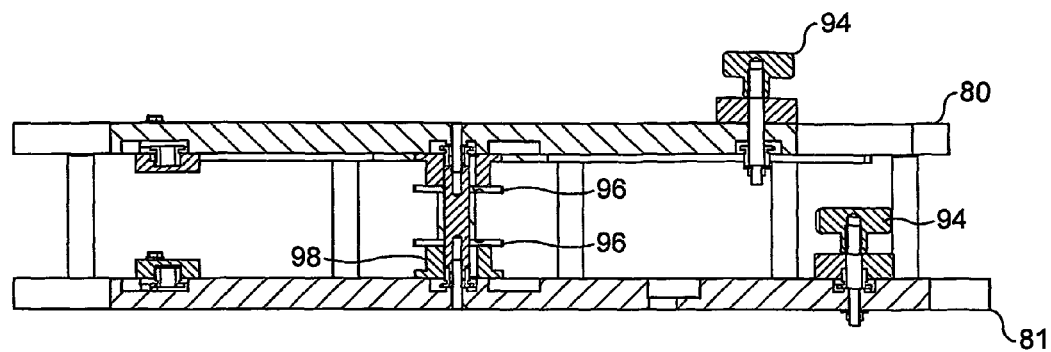
FIG. 10 is a sectional view along line-X-X of FIG. 1.
Figure 11:
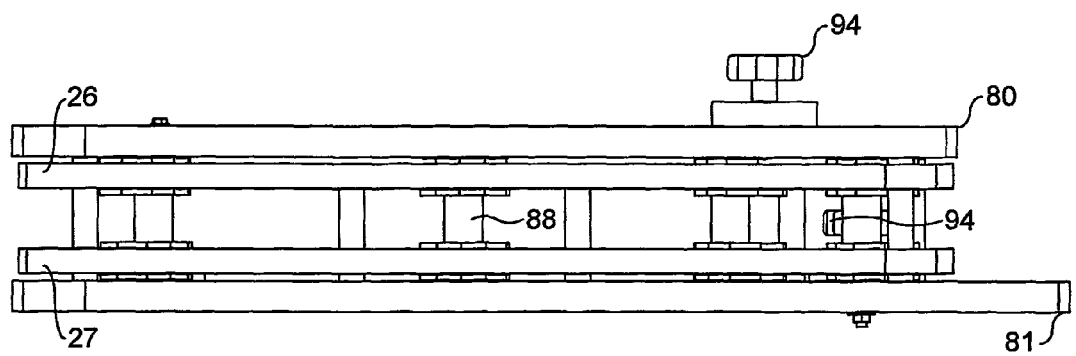
FIG. 11 is a side view of the guide rail assembly of FIG. 8.
Figure 12:
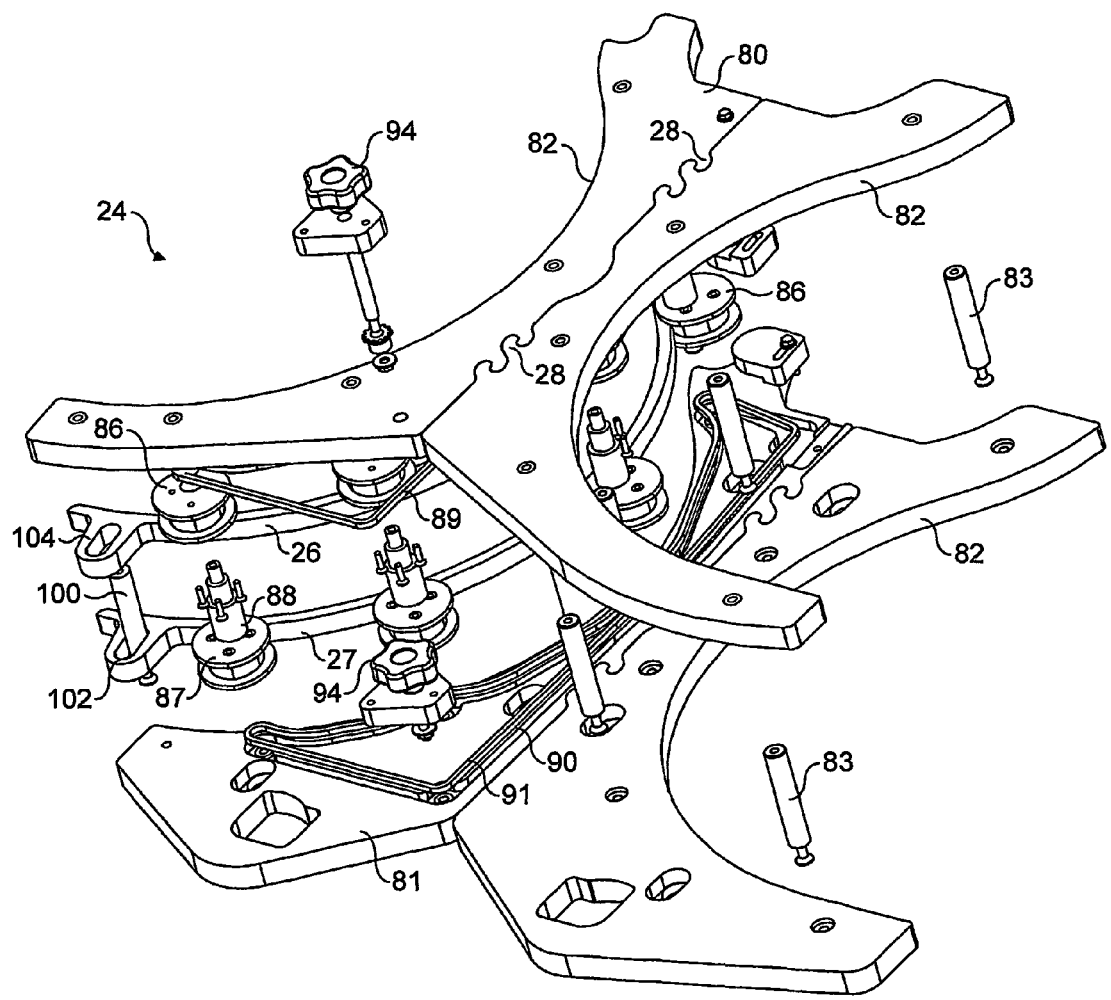
FIG. 12 is an exploded view of the guide rail assembly of FIG. 8.
Figure 13:
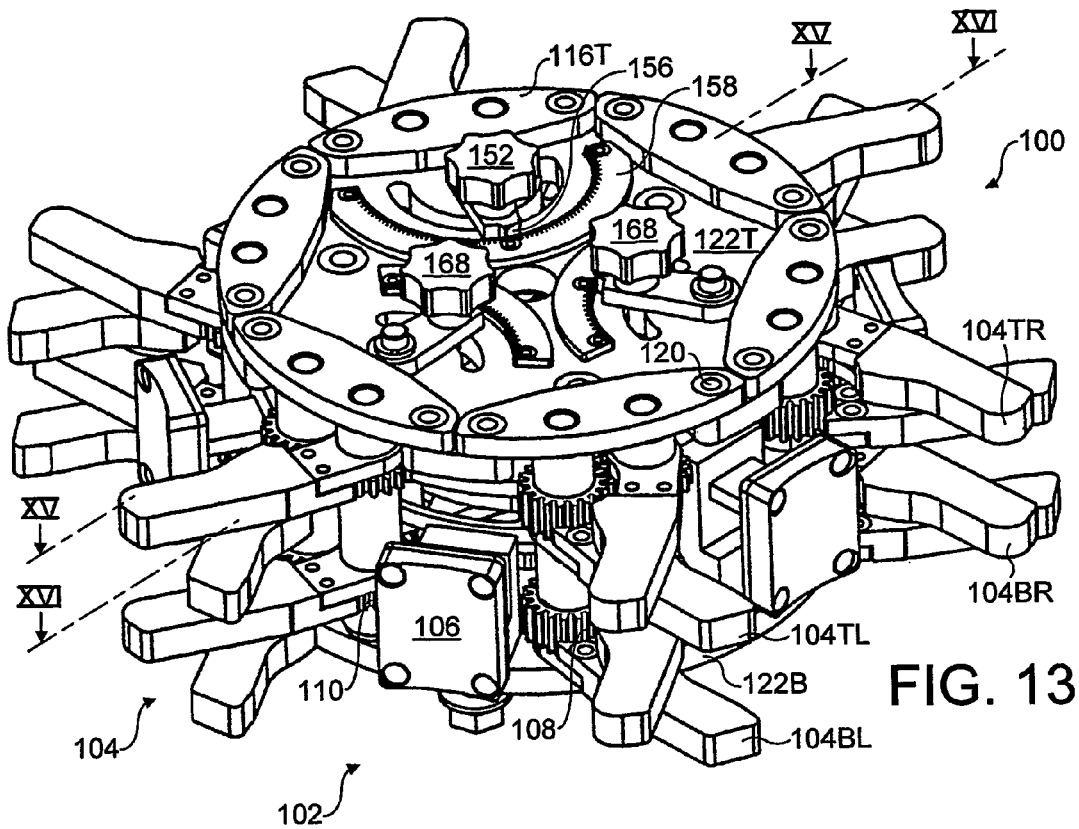
FIG. 13 is a perspective view of a second embodiment of a star wheel according to the present invention.

As can be seen from FIG. 8, the position of the guide rails 26,27 can be adjusted to accommodate bottles of differing sizes. In particular, adjusting the guide rails 26,27 in combination with adjusting the fingers 44 of the star wheel 22 means that bottles of differing sizes can be conveyed along the input path with the centre of each bottle still passing along the path shown at 34.

Each guide rail 26,27 is held in position by four cams 86,87. The cams 86,87 are provided as pairs, one upper 86 and one lower 87, each pair 86,87 having a common shaft 88. However, the shaft 88 may instead be split so that the upper 86 and lower 87 cams reside on separate shafts. These separate shafts would then be co-axial, although the two shafts may be axially displaced. The cams 86,87 may, for example, comprise circular disks of a shallow height mounted eccentrically on the shafts 88. The upper 86 and lower 87 cams are mounted such that they may be rotated independently. All upper cams 86 are connected by an upper chain 89 and all lower cams 87 are connected by a lower chain 91. The chains 89,91 are housed within recesses 90 formed in the upper and lower plates 80,81, the path of each recess crossing the ends of the shafts 88. Each chain 89,91 contacts a sprocket wheel provided on each cam 86,87, a roller and a sprocket wheel provided on the shaft of a thumbwheel 94. Hence, all the upper 86 or lower 87 cams can be rotated together by turning their associated thumbwheel 94.

The guide rails 26,27 are retained in position between upper and lower flanges 96 provided on the cams 86,87 by a tension spring (not shown) so that their backs rest against an internal wall 98 of the cams 86,87. The internal wall 98 of each cam 86,87 is shaped and the cams 86,87 are aligned such that when the cams 86,87 are rotated, the guide rails 26,27 are pushed forward or backward into or out of the input path (as each guide rail 26,27 is held by four cams 86,87, it cannot simply rotate with the cams 86,87).

The path the guide rails 26,27 follow is also constrained by a shaft 100 that projects through a slot 102 provided in a lobe 104 extending from the rear surface of each guide rail 26,27 towards one end thereof. The shaft 100 is circular in cross-section so that it is received snugly within the slot 102, but so that the guide rail 26,27 can slide relative to the fixed position of the shaft 100. Correct alignment of the cams 86,87 means that the guide rail 26,27 moves in a way that preserves the shape of the input path and merely moves its outer edge closer to the star wheel 22. Rotating the cams 86,87 in the other direction causes the guide rails 26,27 to move out of the input path as it allows the guide rails 26,27 to be urged back to their former positions by the tension spring. As the upper 86 and lower 87 cams are connected via separate chains, the positions of the guide rails 26,27 in the input path can be set independently.

The shafts, i.e. the shaft projecting through the lobes 100 and the shafts to which the cams are mounted 88, also serve as spacers for keeping the plates 80,81 a fixed distance apart. The shafts 88, 100 are not present in the output guide rail assembly 24b and so separation of its plates 80,81 is achieved using spacer rods 83.

It will now be appreciated that the star wheel 22 and the guide rail assembly 24 can be adjusted to accommodate bottles of different sizes whilst still ensuring that the centre of the bottle follows the path indicated at 34. In addition, the top 44T and bottom 44B fingers and the upper 26 and lower 27 guide rails can be adjusted independently. This is advantageous for handling bottles of different shapes. For example, consider an example where the star wheel conveyor 20 is adjusted to handle a very large, tall bottle with a short neck (e.g. a one litre bottle of whisky), but where a smaller bottle with a longer neck (e.g. a 250 ml beer bottle) is about to be put through the star wheel conveyor 20. Initially, the fingers 44 will be set to create pockets 32 of the same size thereby to receive the cylindrical girth of the whisky bottle but will require adjustment to fit the beer bottle. The bottom fingers 44B may be adjusted to create a narrower pocket 32 for receiving the body of the beer bottle whilst the top fingers 44T may be narrowed even further to receive the neck of the beer bottle. At the same time, the lower guide rail 27 will be moved inwardly towards the star wheel 22 and the upper guide rail 26 will be moved in further still to define a narrower path for the neck as compared to the body of the beer bottle.

The correct positions of the fingers 44 and guide rails 26,27 are pre-determined. However, the thumbwheels 60,94 may be provided with a scale to allow settings for a particular type of bottle to be recorded. Hence, adjusting the star wheel 22 and guide rail assembly 24 for that type of bottle is easily achieved during subsequent changeovers. Moreover, setting the star wheel 22 and guide rail assembly 24 may be performed automatically, e.g. using optical monitoring equipment to ensure contact of bottle, fingers 44 and guide rails 26,27 and correct alignment of the neck of a bottle with the path at 34.

In addition to accommodating bottles of differing sizes, bottles of differing shapes may also be accommodated. For example, square or rectangular bottles may be conveyed: rather than forming six points of contact as per a round bottle (one against each finger 44 of a pocket 32 and one against the guide rail 26,27, for each of the upper and lower levels), there will be eight points of contact. Moreover, these eight points of contact will define only a single orientation of the bottle (ignoring rotationally symmetric orientations).

A second embodiment of a star wheel 100 according to the present invention is shown in FIGS. 13 to 20. This embodiment contains several modifications to the benefit of compactness. This star wheel 100 also contains six pockets 102, each pocket 102 being defined between two pairs of opposed fingers 104. As before, the convention of appending the letters T, B, L and R to identify the top, bottom, left and right fingers respectively will be used. The fingers 104 may be rotated about vertical axes to change their separation thereby allowing larger or smaller bottles to be accommodated within each pocket 102.

In addition to the fingers 104 contacting a bottle received within a pocket 102, a back plate 106 also contacts the bottle. The back plate 106 is located centrally in the pocket 102 and presents a curved support surface to the bottles to ensure contact at two positions. The back plates 106 may be moved in and out of the pockets 102 to allow a range of sizes of bottles to be accommodated, as will be described in more detail below. Moreover, provision of the back plates 106 stops rotation of bottles within each pocket 102.

Figure 14:
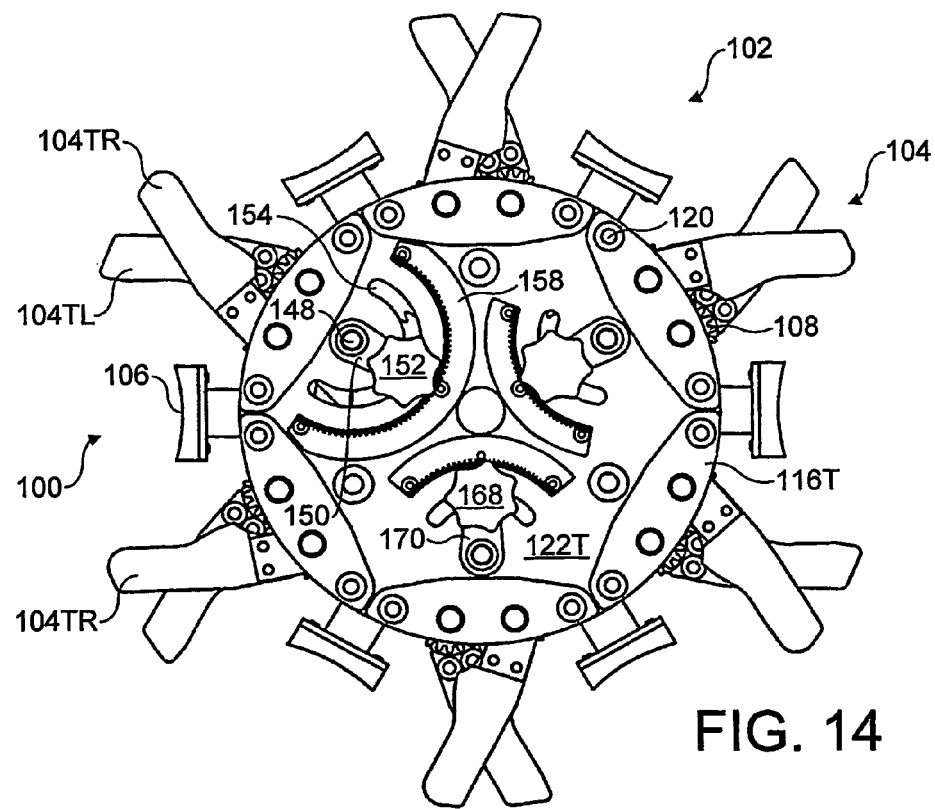
FIG. 14 is a plan view of the star wheel of FIG. 13.
Figure 15:
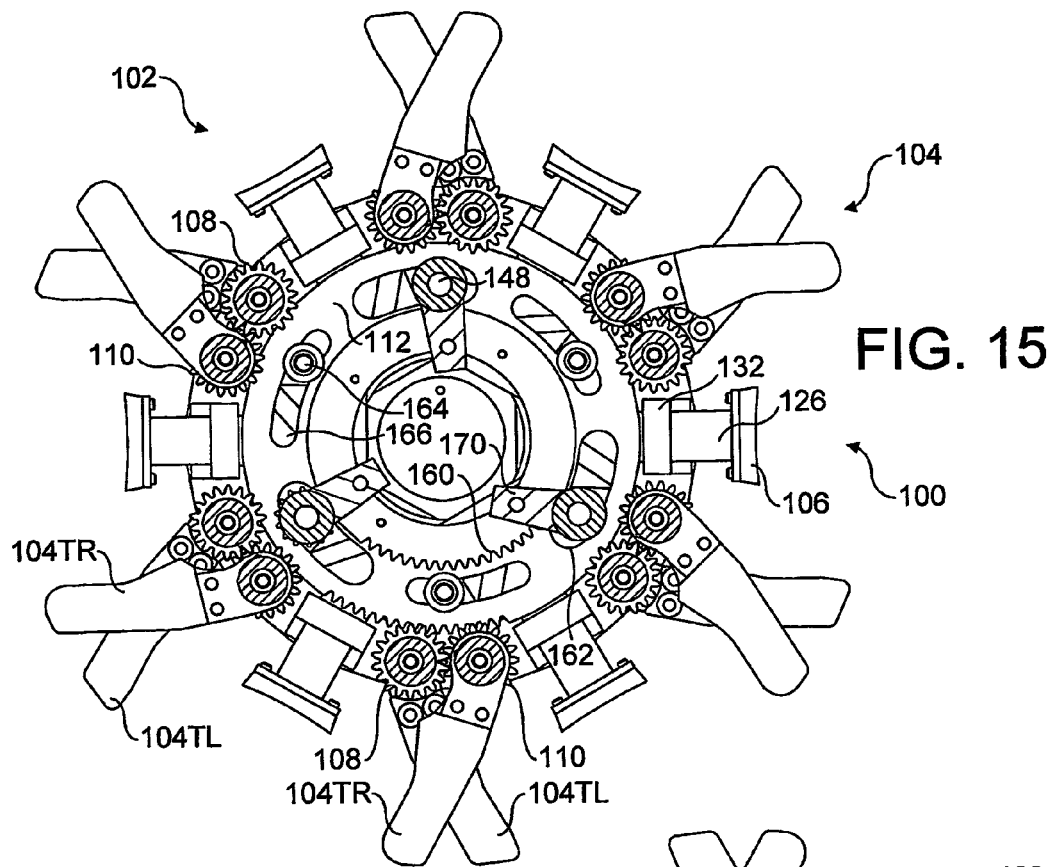
FIG. 15 is a flat section taken through line XV-XV of FIG. 13.
Figure 16:
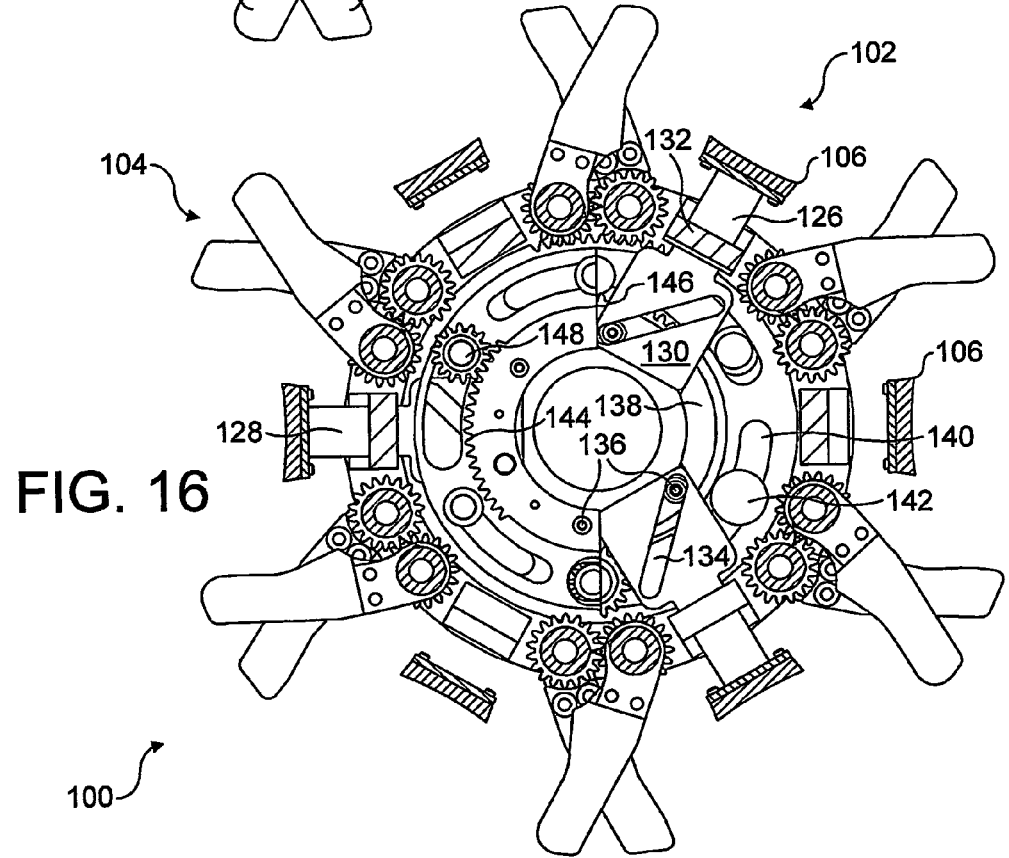
Figure 17:
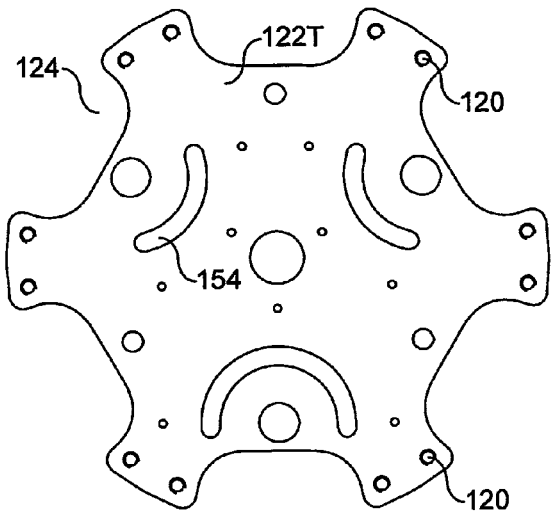
FIG. 17 is a plan view of the top plate of the star wheel of FIG. 13.

In common with the first embodiment, the star wheel 100 has neighbouring fingers 104 from adjacent pockets 102 that are paired to be driven together: the fingers 104 have meshed cog wheels 108,110, one of which is in turn meshed with a larger cog wheel 112 and so acts as a pinion 108. Thus, one of the fingers 104L of each pair is a driver and the other 104R is driven. In this embodiment, the fingers 104 are crossed and so reside at different heights. FIG. 14 shows that the right fingers 104R are located above the left fingers 104L. This crossed arrangement allows a more compact design that can still achieve the same range of movement that defines the gap between the fingers 104.

Figure 18:
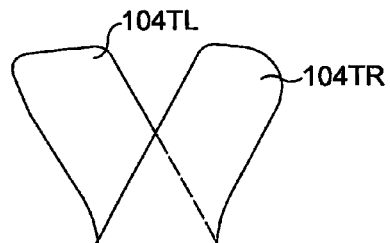
FIG. 18 is a plan view of a finger module of the star wheel of FIG. 13.
Figure 19:
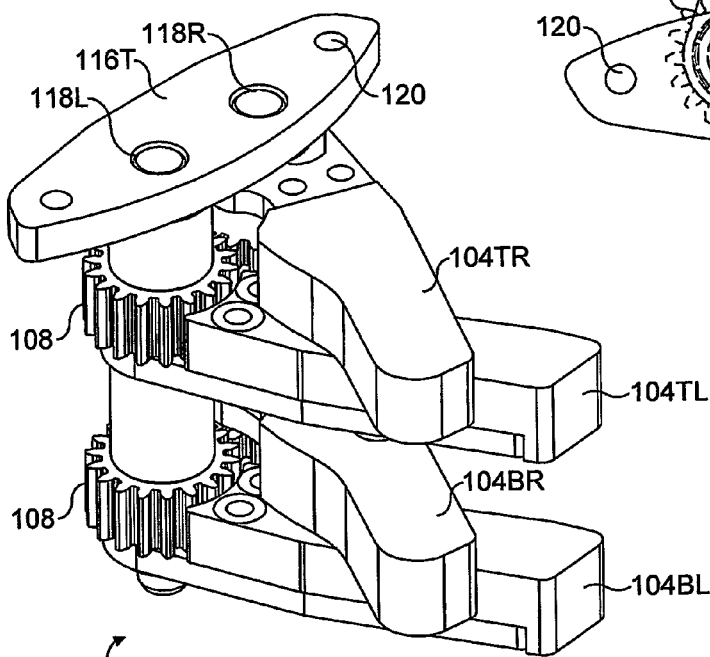
FIG. 19 is a perspective view of the finger module of FIG. 18.
Figure 20:
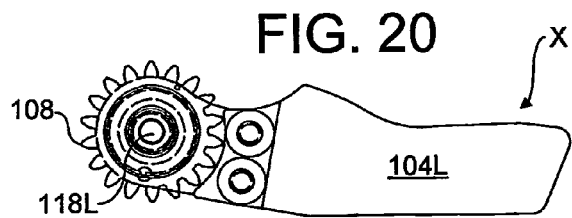
FIG. 20 is a plan view of a finger of the star wheel of FIG. 13.

This embodiment of the star wheel 100 is modular in that the neighbouring fingers 104 from adjacent pockets 102 comprise a module 114, as shown best in FIGS. 18 and 19. Thus the star wheel 100 comprises six modules 114 that may be added and removed as desired. In this way, each module 114 is easily removed for cleaning and/or maintenance or even replacement if a component fails. In addition, a range of modules 114 having fingers 104 of different sizes and/or shapes may be used interchangeably. FIG. 20 shows one example of a finger 104L, shaped to contact a bottle as indicated at X.

Each module 114 comprises a top plate 116T and a bottom plate 116B separated by a pair of shafts 118L,118R upon which the fingers 104 are mounted, left fingers 104L on shaft 118L and right fingers on shaft 118R. Each finger 104T,104B is mounted freely on shaft 118 so that the top 104T and bottom 104B fingers can be rotated independently. Each module 114 attaches to the star wheel 100 via screw fixings 120 that join the top and bottom plates 116 to top and bottom disks 120 respectively. The top disk 120T can be seen more clearly in FIG. 17. The otherwise circular disks 120 are provided with recesses 124 shaped and sized to provide sufficient clearance for the shafts 118 and to allow overlap of holes provided in the plates 116 and disks 120 that receive the screw fixings 120. The outer edges of the plates 116 are arcuate to form a complete circle when all six are attached to either the top 120T or bottom 120B disks.

Now that the arrangement of fingers 104 and back plates 106 has been described, the means for moving them between settings will be described starting with the back plates 106.

Each back plate 106 is attached to a neck 126 of a horizontal flat plate 128 that also comprises an enlarged body 130. The neck 126 extends through an aperture provided in an upright member 132, where it is received snugly such that the back plate 106 is constrained to move radially. The upright members 132 span top 122T and bottom 122B disks, and so the body 130 of each flat plate 128 is received within the interior of the star wheel 100. To achieve a more compact design, the flat plate 128 of alternate back plates 106 are provided at different heights so that the relatively large bodies 130 can be arranged to overlap partially.

A diagonally-extending slot 134 is provided in the body 130 of each flat plate 128 that receives a vertical pin 136 mounted on a cog wheel 138 that is positioned at a height between that of the alternating flat plates 128. Thus, three pins 136 extend upwardly and three pins 136 depend downwardly to be received in the bodies 128. The cog wheel 138 comprises three circumferentially-extending slots 140 that receive pins 142 thereby constraining the cog wheel 138 to rotate about the central axis of the star wheel 100 within a defined range of movement. The cog wheel 138 is stepped with an upper portion of reduced outer radius bearing teeth 144 that engage with a pinion 146. The pinion 146 is mounted on a shaft 148 extending through the top disk 122T. The top of the shaft 148 is connected to the end of an arm 150 that pivots to rotate the pinion 146. The other end of the arm 150 is provided with a thumb wheel 152 that passes through the arm 150 and an arcuate aperture 154 to screw into a clamping plate (not shown). When tightened, the thumb wheel 152 and clamping plate squeeze together against the top disk 122T to clamp the backing plates 106 into position. To adjust the positions of the backing plates 106, the thumb wheel 152 is first unscrewed so that it can be pivoted on its arm 150. The thumb wheel 152 is moved, thereby rotating the shaft 148 and hence pinion 146. This, in turn, drives cog wheel 138 and its pins 136. Movement of the pins 136 within the diagonal slots 140 forces the flat plates 128 to move radially, as constrained by the apertures provided in the upright members 132, thereby setting the position of the backing plates 106. The position of the backing plates 106 can be determined by the position of the arm 150 that is provided with a pointer 156 that moves over a scale 158 provided on the top disk 122.

The top 104T and bottom 104B fingers may be moved independently of one another. Thus, they are provided with separate drive means that are essentially the same. Thus the following description applies equally well to either top 104T or bottom 104B fingers. As described above, adjacent fingers 104 have meshed cog wheels 108,110, one of which is also meshed to a larger cog wheel 112. This cog wheel 112 is stepped, akin to cog wheel 138, to have an upper portion of smaller outer radius having teeth 160 that engage with a pinion 162. The cog wheel 112 is constrained to rotate around the central axis of the star wheel 100 by pins 164 received within circumferentially-extending slots 160. The pinion 162 is attached to a similar arrangement as per the pinion 146, i.e. to a thumb wheel 168 that is used to clamp the fingers 104 into position and to pivot on an arm 170 thereby rotating the pinion 162 and driving the fingers 104. As before, a pointer and scale are provided to indicate the position of the fingers 104.

Figure 21:
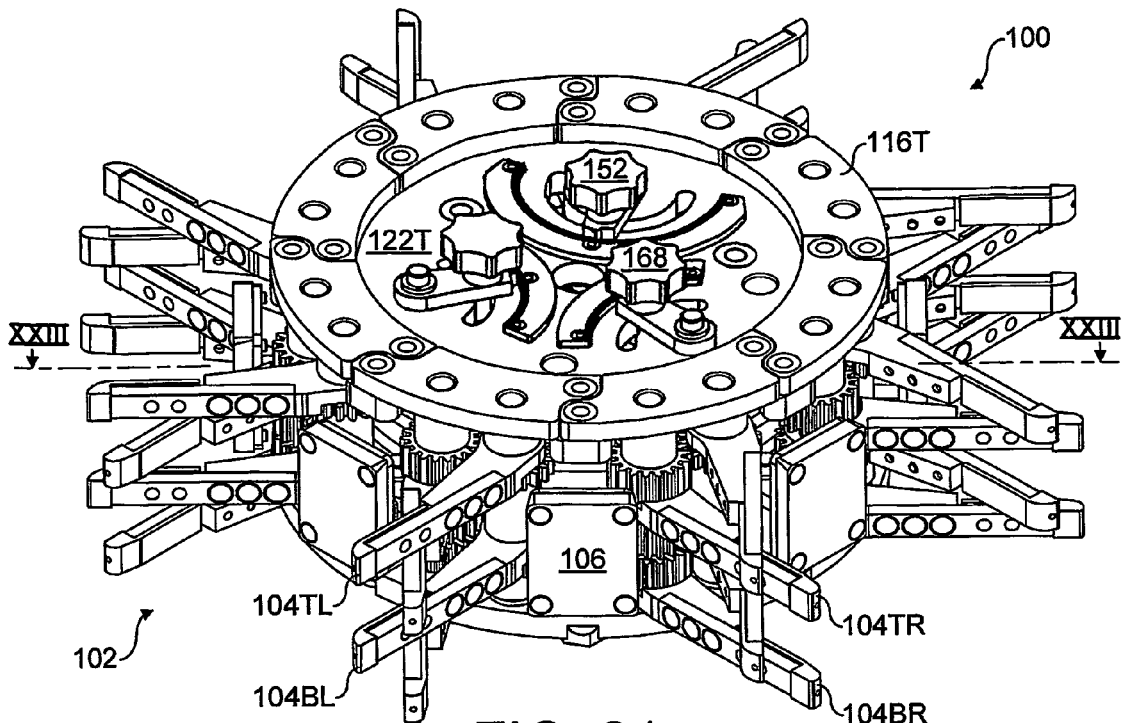
FIG. 21 is a perspective view of a third embodiment of a star wheel according to the present invention.
Figure 22:
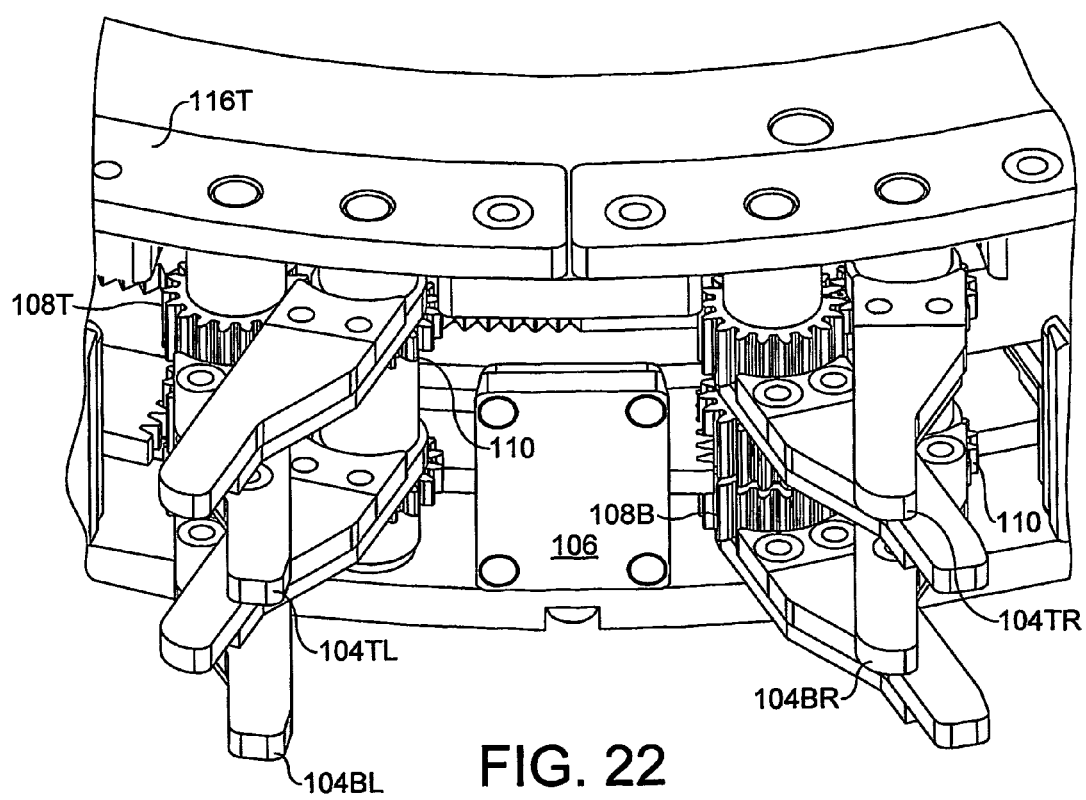
FIG. 22 is a detail of one of the pockets of the star wheel of FIG. 21 in perspective.
Figure 23:
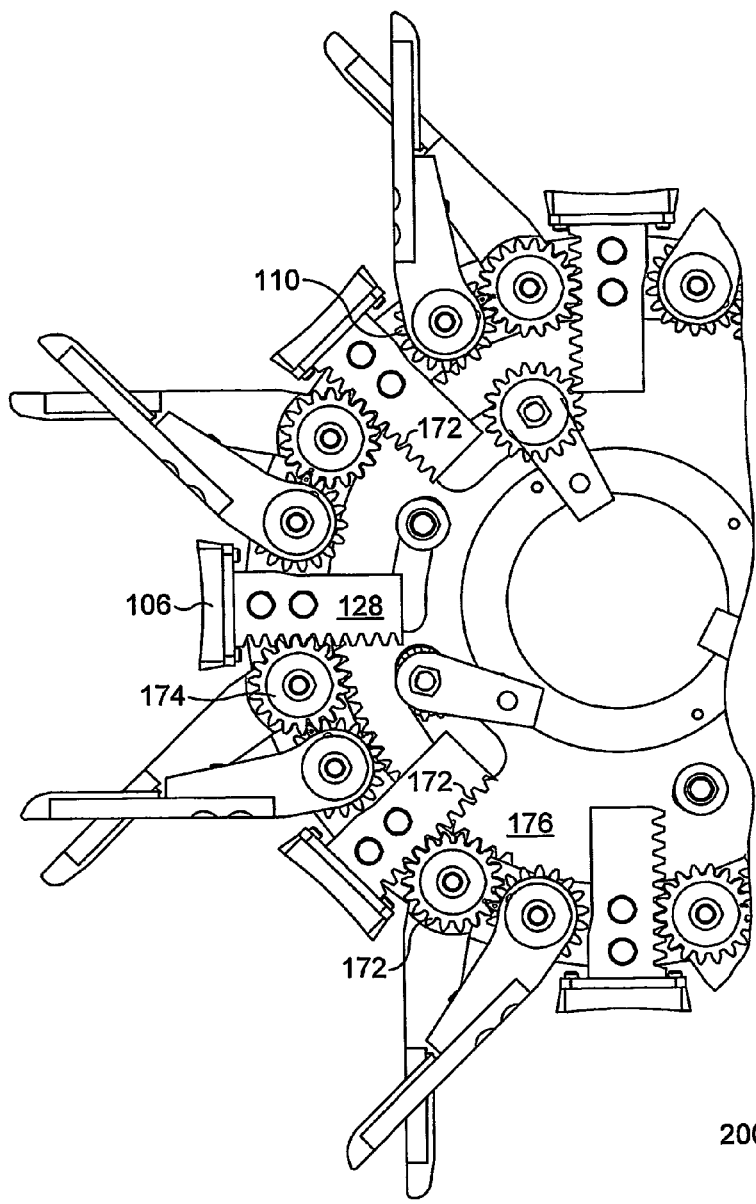
FIG. 23 is a detail of the section taken along line XXIII-XXIII of FIG. 21.
Figure 24:
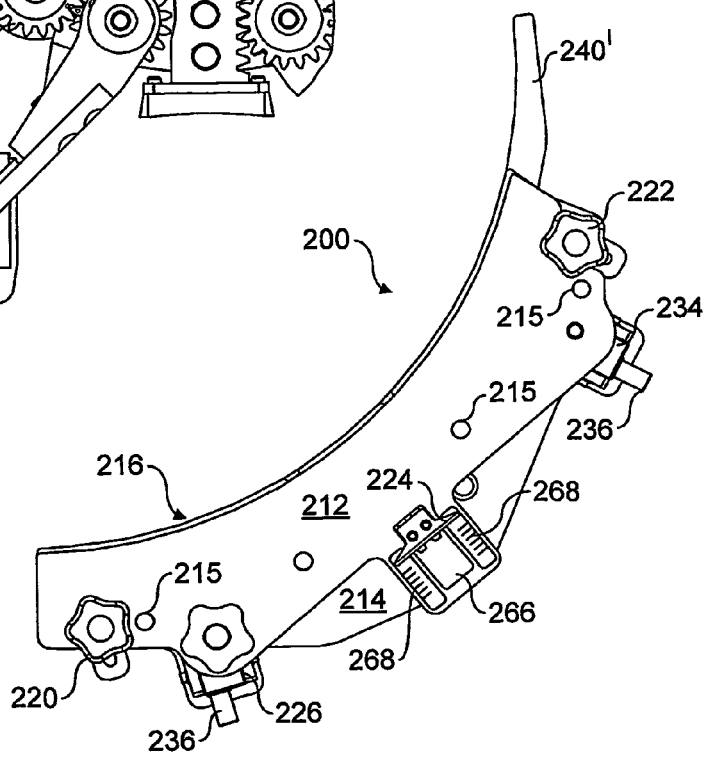
FIG. 24 is a plan view of a second embodiment of a guide rail assembly according to the present invention.
Figure 25:
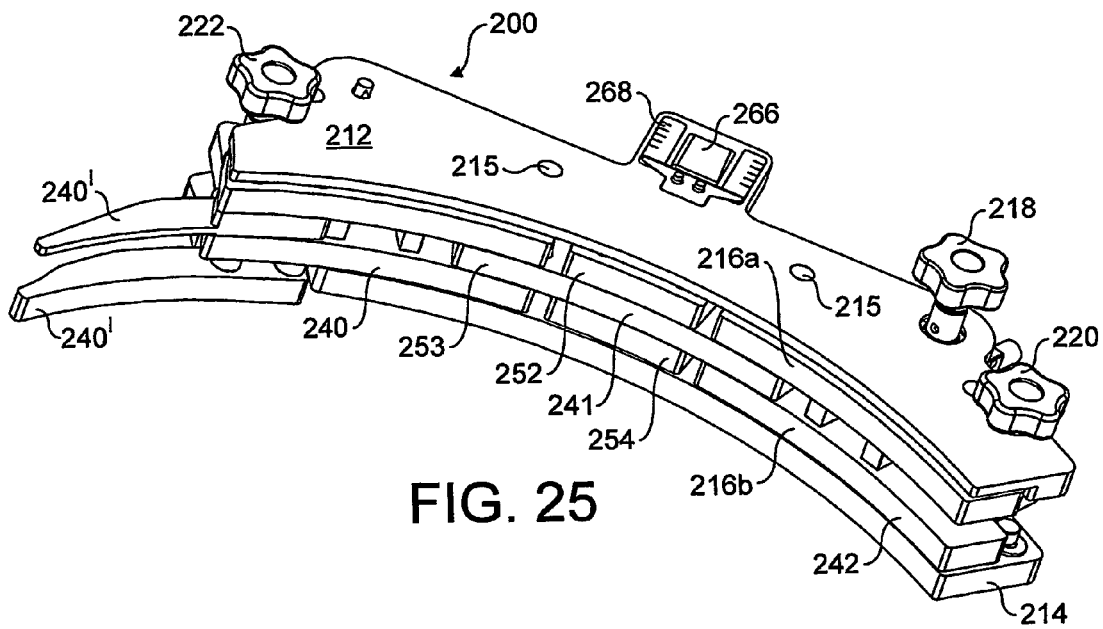
FIG. 25 is a perspective view of the guide rail assembly of FIG. 24 from above and in front.

FIGS. 21 to 23 show a third embodiment of a star wheel 100 according to the present invention. Many features of this third embodiment correspond closely to those of the second embodiment and so many will not be described again to avoid repetition. In addition, like reference numerals are used for like parts.

The third embodiment contains some minor changes. For example, the shape of the fingers 104 has been altered, as has the shape of the plates 116 of the modules 114 (in fact, slightly different shapes are shown in FIGS. 21 and 22). The major change lies in how the back plates 106 are driven. Each back plate 106 is provided with a rectangular plate 128' having teeth 172 provided along one side. Although omitted from the Figures for clarity, the rectangular plate 128' passes through an aperture provided on an upright member 132 that constrains the back plate 106 to move radially. The teeth 172 provided on the rectangular plate 128' engage with a pinion 174 provided, in this embodiment, on the same shaft as cog wheels 108T and 108B although the pinion 174 may be provided on a separate, dedicated shaft. Each cog wheel 108T, 108B and 174 is mounted independently to allow the back plate 106 to be moved independently of the fingers 104R. The pinion 174 has a greater height than that of the rectangular plate 128' such that it projects downwardly far enough to engage with teeth provided on a large cog wheel 176. This cog wheel corresponds to cog wheel 112 and is driven in the same way by thumb wheel 152. Thus, unlocking thumb wheel 152 and rotating it causes the back plates 106 to move radially inward or outward.

A second embodiment of a guide rail assembly 200 is shown in FIGS. 24 to 30.

The automated handling line guide rail assembly 200 defining a generally arcuate path corresponding to the arc of a circle of approximately 100° is shown in FIGS. 24 to 30. The guide rail assembly 200 comprises a generally flat, elongate structure bounded by a top plate 212 and a bottom plate 214 separated by posts 215. The guide rail assembly 200 also comprises a pair of guide rails 216, 217 defining the front arcuate surface. The guide rails 216, 217 correspond in size and shape and are positioned one 216 above the other 217. Three thumb wheels 218, 220, 222 and a position indicator 224 sit proud of the top plate 212.

Figure 26:
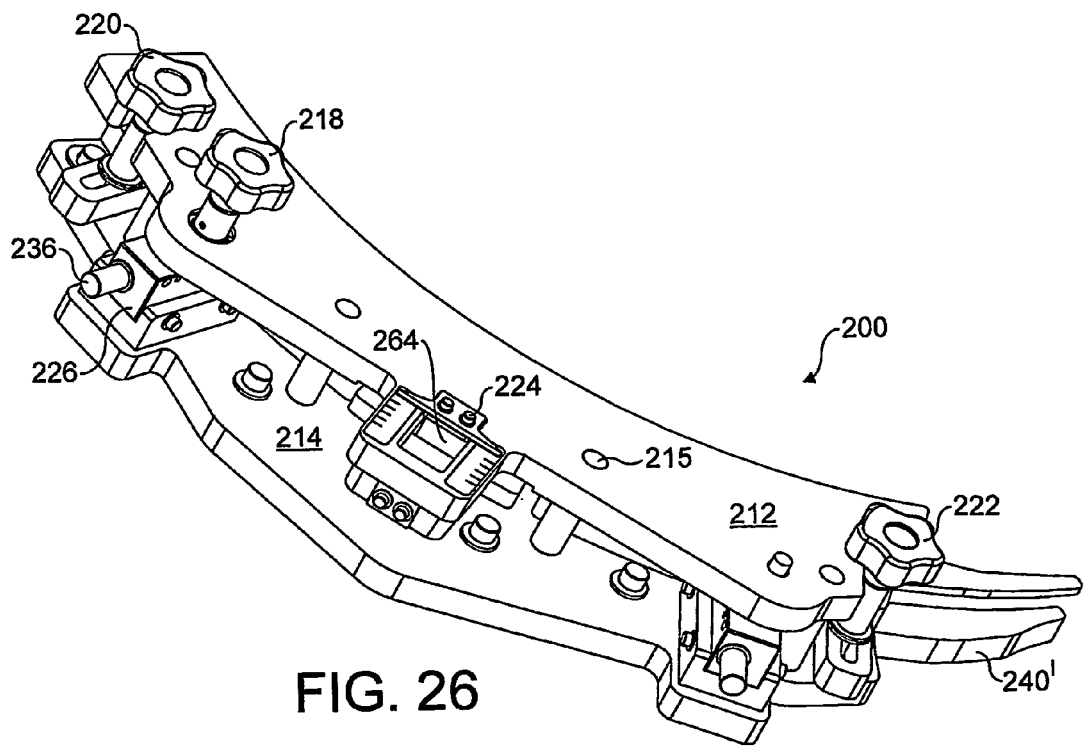
FIG. 26 is a perspective view of the guide rail assembly of FIG. 24 from above and behind.
Figure 28:
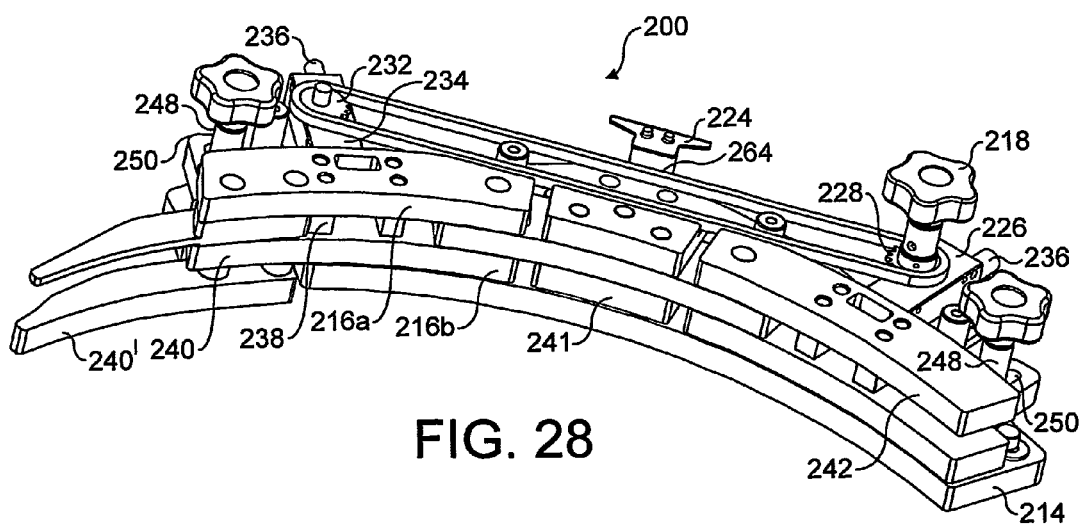
FIG. 28 is a perspective view of the guide rail assembly of FIG. 24 from above and in front, with the top plate removed.
Figure 29:
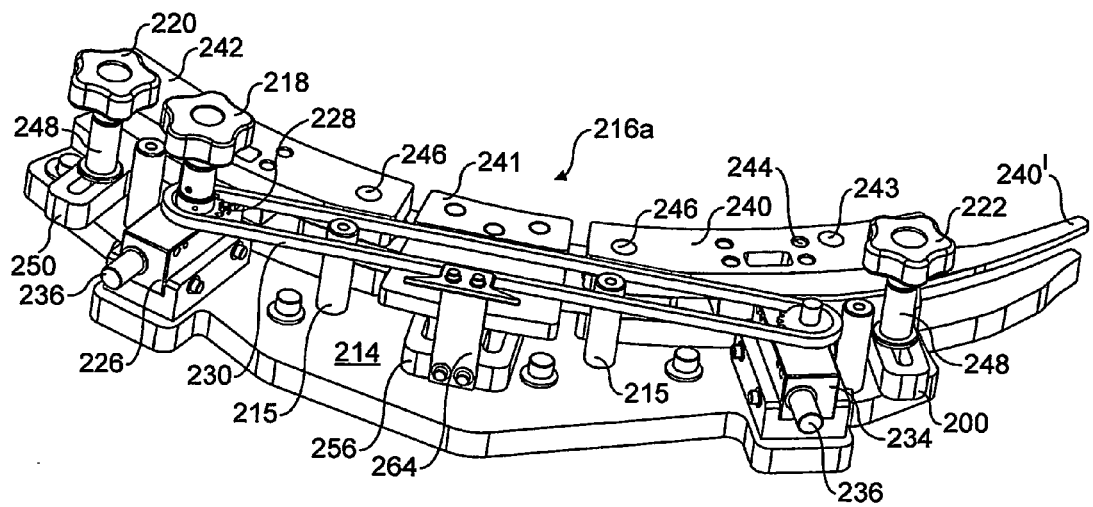
FIG. 29 is a perspective view of the guide rail assembly of FIG. 24 from above and behind, with the top plate removed.
Figure 30:
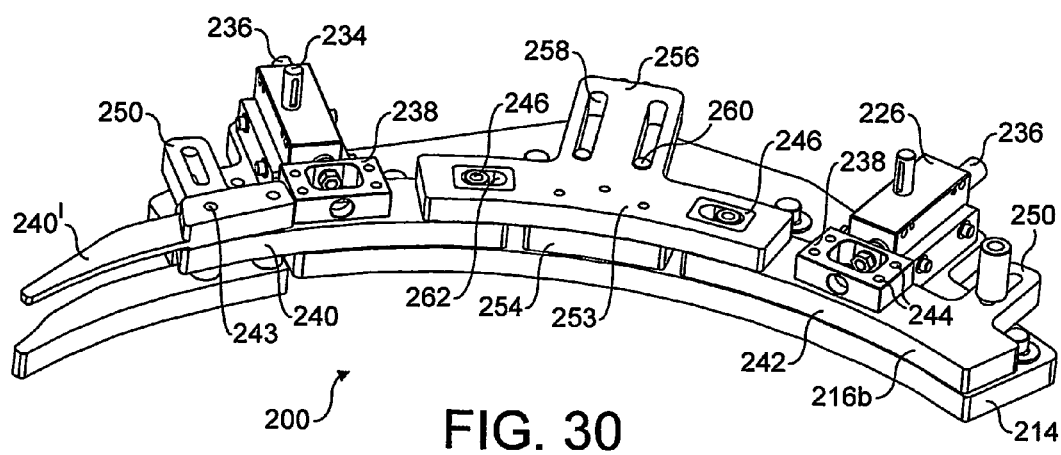
FIG. 30 is a perspective view of the guide rail assembly of FIG. 24 from above and in front, with various parts removed to show other features of the invention.

As can best be seen from FIG. 26, one of the thumb wheels 218 is mounted on a shaft that extends through the top plate 212 to enter an actuator box 226. Also mounted on the shaft beneath the thumb wheel 218 is a drive sprocket 228 that is used to drive a chain 230, as best seen in FIGS. 28 and 29. The other end of the chain 230 passes around a driven sprocket 232 that is mounted on a shaft that is connected to a second actuator box 234, identical to the first actuator box 224. The actuator boxes 226,234 are provided with a rack and pinion gearing. The pinions are provided on the bottoms of the shafts also mounting the sprockets 228,232, and the pinions are provided as rods 235 that are connected to yokes 238. The yokes 238 are in turn connected to the guide rails 216,217, as best seen in FIG. 30. Accordingly, rotating the thumb wheel 218 causes the guide rails 216,217 to be driven in and out by the rack and pinion gearing of the actuator boxes 226,234.

The other thumb wheels 220,222 provide a clamp that is used to secure the guide rails 216,217 in position. Both thumb wheels 220,222 are provided on a shaft with a screw thread that, when tightened clamps together the top 212 and bottom 214 plates thereby firmly sandwiching the components therebetween to lock the guide rails 216,217 in position.

As can best be seen from FIG. 28, the guide rails 216, 217 are divided into various parts that make up top 216 and bottom 217 guide rails, and left 240, centre 241 and right 242 segments. While the right segment 422 comprises only a single element for each of the top 216 and bottom 217 guide rails, the left segment 240 comprises a corresponding element that is joined via pins 243 to a lower finger 240'. These fingers 240' are positioned to mesh with fingers of a star wheel positioned at the same level as guide rails 216,217.

Both guide rails 216,217 move in unison in this embodiment by virtue of various pins that extend therebetween. For example, pins 244 protrude through apertures provided in the yokes 238 to be received in holes provided in the top 216 and bottom 217 guide rails. Other pins 246 pass through top 216 and bottom 217 guide rails and provide a link between adjacent segments. However, in other contemplated embodiments, the top 216 and bottom 217 guide rails may be moved independently, i.e. each of the top 216 and bottom 217 guide rails has its own dedicated pair of actuator boxes 226,234, and thumb wheel 218 and drive chain 230.

Figure 27:
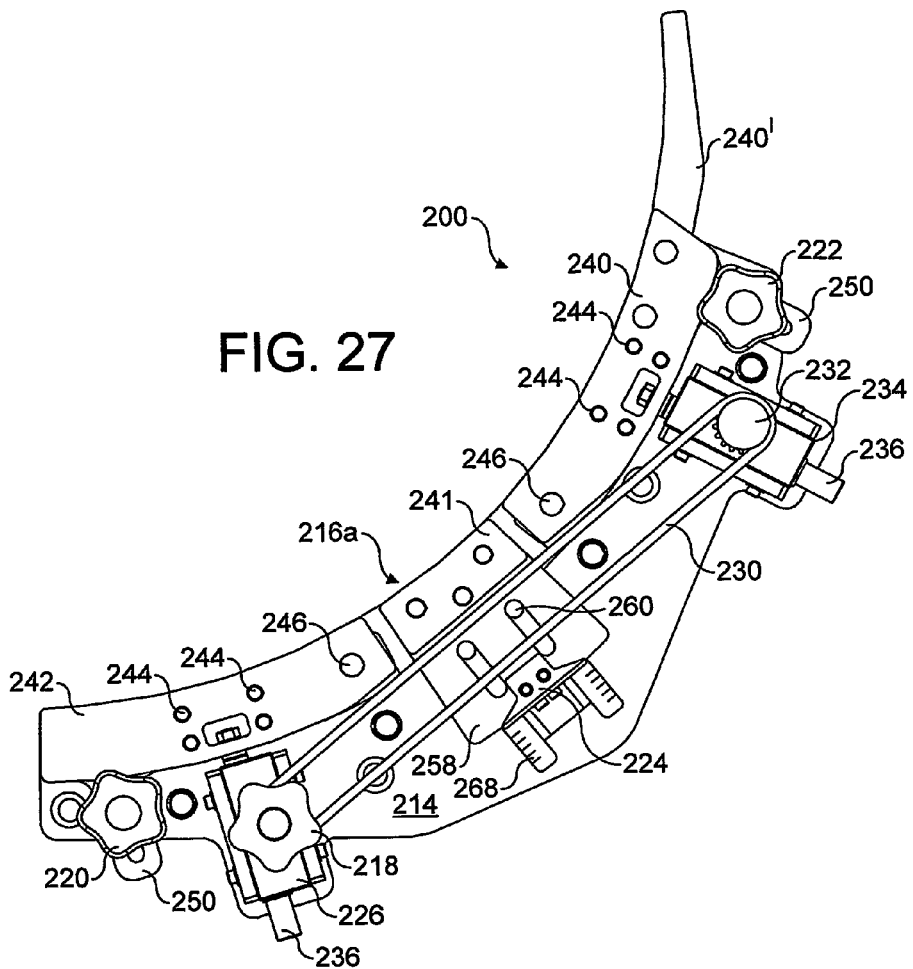
FIG. 27 is a plan view of the guide rail assembly of FIG. 24 with the top plate removed.

As can be seen most clearly from FIG. 27, the left segment 40 is connected to the yoke 238 of actuator box 234 and the right segment 242 is connected to the yoke 238 of actuator box 226. Accordingly, left 240 and right 242 segments are driven to move in the direction of movement of the rods 236 of actuator boxes 226,234. The motion of the left 240 and right 242 segments is further constrained by a series of guide members that comprise posts 248 passing through apertures of a corresponding width but with an elongate length provided in enlarged lobes 250 of the left 240 and right segments. The posts are in fact provided by the shafts upon which the clamping thumb wheels 220,222 are mounted, hence reducing the total parts count of the guide rail assembly 200. The rods 236 of the actuator boxes 226,234 and the apertures provided in the lobes 250 are elongate in the radial direction of the arc that the guide rails 216,217 provide. Thus, the left 240 and right 242 segments are constrained to move radially in and out. Common gearing of the sprockets 228,232 that co-operate with the drive chain 230 ensures that the left 240 and right 242 segments move radially at the same rate.

The middle segment 241 comprises a three tier element: the top 252 and bottom 254 tiers comprise plates at the heights of the top 216 and bottom 217 guide rails adjacent the left 240 and right 242 segments, whereas the middle tier comprises a longer plate that extends at each side into the gap separating the top 216 and bottom 217 guide rail portions 253 of the left 240 and right 242 segments. Middle tier 253 includes a tab 256 at its rear that has a pair of slots 258. These slots 258 are also elongate in the radial direction and receive a pair of pins 260. Hence, the middle segment 241 is also constrained to move radially in and out.

The middle tier 253 also comprises a second pair of slots 262 at its ends that receive the pins 246 that fasten the top 216 and bottom 217 guide rails together. The slots 262 are elongate with a width corresponding to the pins 246 and a greater length that extends in a generally circumferential direction. Thus, the pins 246 provide a link between the left 240, middle 241 and right 242 segments such that rotating the thumb wheel 218 drives all three segments 240,241,242 to move radially. Specifically, while left 240 and right 242 segments are driven by the actuator boxes 226 and 34, the pins 246 making contact with the edges of apertures 262 urge the middle segment 241 to follow the left 240 and right 242 segments. Moreover, as the segments 240,241,242 are being driven radially, their separation must either increase or decrease as the circumference of the arc they subtend changes. For example, when being driven inwardly, the segments 240,241,242 will move together to define a smaller circumference as the outer limit of the path. The slots 262 provided in the middle tier 253 of the middle segment 241 allow the segments 240,241,242 to move inwardly towards each other thereby preventing jamming of the mechanism. As will be appreciated, the pins 246 merely slide along the slots 62 thereby allowing separation to vary.

Thus, as the guide rails 216,217 are moved, the outer limit of the path the container will follow changes relative to the centre path and, moreover, the circumference of the outer path also changes to match the change in radius. This change in circumference is provided by the expandable gaps between the left 240 and middle 241 segments, and the middle 241 and right 242 segments that allow the guide rails 216,217 as a whole to expand and contract as they are moved radially.

As described previously, a position indicator 224 is provided on top of the guide rail assembly 200. This position indicator 224 comprises a flat plate with a straight edge that is mounted from an upright 264 that is in turn fastened to the back of the tab 256 of the middle tier 253 of the middle segment 241. The upright 264 projects through an aperture 266 provided in the top plate 212 thereby allowing the position indicator 224 to move with the middle segment 241. The position indicator 224 is mounted with the edges of its straight edge above a pair of scales 268 provided on the top plate 212 to allow the position of the guide rails 216,217 to be determined.

The skilled person will appreciate that the above embodiment may be varied in many different respects without departing from the scope of the present invention.

For example, the above star wheel conveyor 20 is described in the context of a bottling line that may be used for presenting bottles for cleaning, filling or labelling. However, the present invention lends itself to many other types of automated handling lines for performing other operations and for processing many types of containers such as those handling cans or tins. The containers may already be filled when handled by the star wheel conveyor 20 or may be empty or may even be partially filled. The contents (existing or eventual) are largely irrelevant to the present invention. For example, the containers may be for the food and drink industry or may contain many other products. Some obvious examples are perfume, paint, detergents or medicines. Moreover, the products need not be liquid, but could be gaseous or solid (including particulates or powders such as salt crystals or bath salts).

Other details of the star wheel conveyor 20 may be varied. In general, the materials of the various components constituting the star wheel conveyor 20 have not been described. This is because they are a matter of routine choice and may be freely varied according to the purpose of the automated line. For example, some lines may require sterile conditions that will impose strict criteria on the choice of materials.

The cog wheels 52,53;138 of the star wheel 22;100 are convenient in that they allow all the top 44T;104T and bottom 44B;104B fingers to be adjusted synchronously and by the same amount. However, this feature is not essential. Instead, each finger 44;104 may be individually rotatable or pairs of neighbouring fingers 44;104 may be adjusted together. Furthermore, the use of cog wheels 52,53;138 is not the only way to affect synchronous adjustment of all top 44T;104T and bottom 44B;104B fingers. A chain linked to chain wheels provided on the fingers 44;104 or a belt that contacts part of each finger 44;104 could be used to drive the fingers 44;104.

Of course, the ability to adjust the top 44T;104T and bottom 44B;104B fingers and the upper 26;216 and lower 27;217 guide rails independently is useful for accommodating bottles having different sizes at their tops and bottoms, but this feature would be redundant when handling bottles that do not vary in size between top and bottom. In this case, top 44T;104T and bottom 44B;104B fingers could be fixed to their shafts 50 such that they rotate together, and likewise for the upper 86 and lower 87 cams. Only one thumbwheel 60,94 would be required each for the star wheel 22;100 and the guide rail assembly 24. Of course, the guide rails 216,217 of FIGS. 24 to 30 move in unison.

The shape of the fingers 44;104 may be varied from that shown in FIG. 7. Whilst arcuate contact surfaces 48 are preferred, the fingers 44;104 may have straight contact surfaces or a rectilinear series of straight contact surfaces.

The guide rail assemblies 24;200 need not be provided with adjustable guide rails 26,27;216,217. In fact this is the case for the guide rail assembly 24 on the output side of FIG. 1: rather than having adjustable guide rails 26,27, the peripheral edges 82 of the upper 80 and lower 81 plates act as fixed guide rails for bottles passing along the output path.

Where the guide rail assembly 24 of FIGS. 8 to 12 has adjustable guide rails 26,27, the shapes of the cams 86,87 and/or the eccentricity of their mounting can be varied to create the desired variation in the input or output paths. Generally, the shape will be such that the guide rails 26,27 are pushed into and out of the paths to ensure the necks of bottles follow the path at 34. The number of cams 86,87 may also be varied, although three or more cams 86,87 for each guide rail 26,27 is preferred. The method of driving the cams 86,87 may also be varied, by using a belt for example. Obviously, these considerations also apply to the actuator boxes 226, 234 of the guide rail assembly 200 of FIGS. 24 to 30.

The guide rails 26,27 of FIGS. 8 to 12 comprise an elongate plate that defines the surface that contacts bottles being conveyed. Thus, the guide rails 26,27 sit in front of the cams 86,87 and are urged into position against the cams 86,87 by the tension spring. This ensures the guide rails 26,27 can be moved back away from the star wheel 22. However, an alternative embodiment is envisaged that does not require a return spring. In this embodiment, each guide rail 26,27 comprises a second elongate plate of corresponding shape that is spaced apart from the first plate by the width of the cams 86,87. The two plates are connected, e.g. at their ends to form a rubber-band like shape or by struts provided at central positions of the plates. The first plate is positioned in front of the cams 86,87 whilst the second plate is positioned behind the cams 86,87. Thus rotation of the cams 86,87 in either direction will urge one of the plates to move and so cause the guide rail 26,27 to move either in or out. To maintain the correct spacing between the two plates, cams 86,87 comprising eccentrically-mounted circular disks are preferred. Alternatively, the guide rails 26,27 may include plastic backing strips that encircle the cams 86,87 thereby providing a return mechanism. Other equivalent arrangements will be readily apparent to the skilled reader.

Whilst the embodiment has pairs of fingers 44;104 at the same height as one of the guide rails 26,27;216,217, other arrangements may be adopted. For example, a single pair of fingers 44; could be provided at a height intermediate that of the guide rails 26,27;216,217, or a single guide rail 26,27; 216,217 could be provided between pairs of fingers 44;104.

Although the above embodiment have a guide rail assemblies that defines an arcuate path, other shapes are clearly also possible. For example, elliptical shapes can easily be achieved, as can other serpentine paths. One possibility is an S-shaped path using the assembly of FIGS. 24 to 30 where some segments 240,241,242 of the guide rails 216,217 will move closer together while the separation of other segments will increase.

Whilst the embodiment of FIGS. 24 to 30 employs triple-segmented guide rails 216,217, clearly any number of segments may be chosen for any particular purpose. Clearly, the more segments the better in that the invariance in the shape of the guide rails 216,217 as they move. This is because each individual segment 240,241,242 has a fixed radius of curvature (chosen to be an average value for the required paths) and it is the expandable gaps between the segments 240,241,242 that allows the overall shape to be maintained. However, the more segments, the greater the complexity of the guide rail assembly 210 so there will always be a trade-off in this respect. However many segments are chosen, the number of segments provided with a dedicated actuator box 226,234 may also be freely chosen. For example, a four-segment device is envisaged that is provided with a pair of actuator boxes to drive the leftmost and rightmost segments, the two middle segments being indirectly driven through links. However, more actuator boxes could be provided, such as in a five segment guide rail wherein the first, third and fifth segments are directly driven and the second and fourth segments merely follow. Of course, only one segment need be driven and all remaining segments could follow.

The above embodiment uses actuator boxes 226;234 that employ a rack and pinion system but other means that provide rotation to linear movement could be equally employable, such as a cam mechanism. For example, an eccentrically mounted roller may be employed that is used to push the guide rail segments radially in and out. Moreover, a rotational actuator such as a thumb wheel need not be provided. Other rotational actuators may be used or even linear actuators, such as slide members, may be used.

The invention claimed is:

1. An adjustable star wheel rotatable about a central axis, comprising a plurality of pockets distributed around the star wheel for receiving a container therein, each pocket being defined at least in part by a pair of opposed, spaced apart fingers, each finger providing a contact surface for contacting a container when received in its associated pocket and being rotatably mounted on respective shafts extending substantially parallel to the central axis so as to be rotatable in opposite senses within a range of movement thereby adjusting the width of the pocket they define, the star wheel further comprising setting means operative to set the fingers in substantially any position within their range of movement, a toothed common drive means and wherein the fingers are provided with teeth, the common drive means and fingers being arranged with meshed teeth such that the fingers are rotatably driven by the common drive means, and wherein the teeth of one finger from each pair defining a pocket meshes with the teeth of the drive means in a rack and pinion arrangement.

2. An adjustable star wheel according to claim 1, wherein each rotatable finger is generally elongate radially with respect to the star wheel and its shaft is located at or towards an end closest to the central axis.

3. An adjustable star wheel according to claim 1, further comprising a movable back plate operative to be moved substantially radially into and out from each pocket.

4. An adjustable star wheel according to claim 1, wherein neighbor fingers from adjacent pockets are mounted on their shafts in a crossed configuration.

5. An adjustable star wheel according to claim 1, wherein the teeth of the finger meshed with the common drive means also mesh with the teeth of its neighbor finger from the adjacent pocket, every other finger around the star wheel meshing with the common drive means such that the common drive means drives each set of neighbor fingers in opposite sense.

6. An adjustable star wheel according to claim 1, further comprising a thumb wheel attached to a shaft to which a cog wheel is also attached that engages with co-operating teeth of the common drive means.

7. An adjustable star wheel according to claim 1, further comprising a moveable back plate operative to be moved substantially radially into and out from each pocket.

8. An adjustable star wheel according to claim 7, wherein the back plates are moveable by a further common drive means.

9. An adjustable star wheel rotatable about a central axis, comprising at least one pocket for receiving a container therein, and a pair of opposed, spaced apart fingers defining at least in part the pocket, each finger providing a contact surface for contacting a container when received in the pocket, wherein at least one of the fingers is rotatably mounted on a shaft extending substantially parallel to the central axis so as to be rotatable within a range of movement thereby adjusting the width of the pocket, the star wheel further comprising setting means operative to set the rotatable finger in substantially any position within the range of movement, wherein each pocket is partially defined by a second pair of fingers like the first pair, the first and second pair of fingers being spaced apart in the axial direction and mounted independently on a common shaft and provided with separate drive means and separate setting means, thereby allowing independent adjustment and setting of the positions of each of the two sets of axially-separated fingers.

10. An adjustable star wheel rotatable about a central axis, comprising at least one pocket for receiving a container therein, and a pair of opposed, spaced apart fingers defining at least in part the pocket, each finger providing a contact surface for contacting a container when received in the pocket, wherein at least one of the fingers is rotatably mounted on a shaft extending substantially parallel to the central axis so as to be rotatable within a range of movement thereby adjusting the width of the pocket, the star wheel further comprising setting means operative to set the rotatable finger in substantially any position within the range of movement, wherein the at least one pocket is symmetrical about a center line corresponding to the radius of the star wheel and the pair of fingers comprise curved contact surfaces whose curvature extends away from the center line as the fingers extend away from the central axis.

11. An adjustable star wheel rotatable about a central axis, comprising a plurality of pockets distributed around the star wheel for receiving a container therein, each pocket being defined at least in part by a pair of opposed, spaced apart fingers, each finger providing a contact surface for contacting a container when received in its associated pocket and being rotatably mounted on respective shafts extending substantially parallel to the central axis so as to be rotatable in opposite senses within a range of movement thereby adjusting the width of the pocket they define, the star wheel further comprising setting means operative to set the fingers in substantially any position within their range of movement, a toothed common drive means and wherein the fingers are provided with teeth, the common drive means and fingers being arranged with meshed teeth such that the fingers are rotatably driven by the common drive means, a plurality of moveable back plates operative to be moved substantially into and out from each pocket by a further common drive means, and wherein the further common drive means is an annular member and the back plates are mounted on substantially radially-extending members that overlap with the annular member, the overlapping portions being provided with a diagonally-extending slot and a post received therein such that rotation of the annular member causes radial movement of the back plates.

12. An adjustable star wheel rotatable about a central axis, comprising at least one pocket for receiving a container therein, and a pair of opposed, spaced apart fingers defining at least in part the pocket, each finger providing a contact surface for contacting a container when received in the pocket, wherein at least one of the fingers is rotatably mounted on a shaft extending substantially parallel to the central axis so as to be rotatable within a range of movement thereby adjusting the width of the pocket, the star wheel further comprising setting means operative to set the rotatable finger in substantially any position within the range of movement; and a guide rail assembly comprising a guide rail that defines the perimeter of a path of a container when conveyed along part of an automated handling line, the path and hence the perimeter being arcuate about a center and positioned at a radius from the center, wherein the guide rail is movable radially to define the perimeter at a plurality of different radii from substantially the same center.

13. A star wheel conveyor according to claim 12, wherein the guide rail comprises at least two segments, a first segment being driveable in a substantially radial direction and a second segment being connected to the first segment by a link such that the second segment follows movement of the first segment.

14. A star wheel conveyor according to claim 13, wherein the second segment is constrained to move radially by guide means.

15. A star wheel conveyor according to claim 14, wherein the guide means comprises a post received within a slot, the slot being elongated radially.

16. A star wheel conveyor according to claim 13, further comprising a third segment wherein the third and second segments are configured to correspond to the first and second segments.

17. A star wheel conveyor according to claim 12, wherein the first and second segments are arranged in superposition to overlap and are provided with a slideable link between overlapping portions to allow the separation of the first and second segments to decrease and increase as the segments move inwardly and outwardly.

18. A star wheel conveyor according to claim 17, wherein the slideable link comprises a post received within a circumferentially elongate slot.

19. A star wheel conveyor according to claim 12, further comprising a clamping mechanism operable to clamp the guide rail in position.

20. A star wheel conveyor according to claim 12, further comprising a position indicator and a scale, wherein one of the position indicator or scale is fastened to the guide rail to move therewith and the other is fixed in position.

21. A star wheel conveyor according to claim 12, further comprising a second like guide rail wherein the second guide rail is moveable independently of the first guide rail.

22. A star wheel conveyor according to claim 12, further comprising a second, like guide rail assembly arranged back to back with the first guide rail assembly.

* * * * *